US00RE40582E

(19) United States
(12) Reissued Patent
Ishii et al.

(10) Patent Number: US RE40,582 E
(45) Date of Reissued Patent: Nov. 25, 2008

(54) ZOOM LENS SYSTEM

(75) Inventors: Atsujiro Ishii, Tokyo (JP); Yuji Miyauchi, Tokyo (JP)

(73) Assignee: Olympus Corporation, Tokyo (JP)

(21) Appl. No.: 10/359,193

(22) Filed: Feb. 6, 2003

Related U.S. Patent Documents

Reissue of:
(64) Patent No.: 6,185,048
Issued: Feb. 6, 2001
Appl. No.: 09/172,263
Filed: Oct. 14, 1998

(30) Foreign Application Priority Data

Oct. 14, 1997 (JP) ..... 9-280758
Jan. 9, 1998 (JP) ..... 10-003215
Aug. 31, 1998 (JP) ..... 10-244643

(51) Int. Cl.
*G02B 15/14* (2006.01)

(52) U.S. Cl. ..... 359/687; 359/683; 359/684; 359/685

(58) Field of Classification Search ..... 359/683, 359/684, 685, 687
See application file for complete search history.

(56) References Cited

U.S. PATENT DOCUMENTS 4,859,042 A * 8/1989 Tanaka ..... 350/423
5,189,558 A * 2/1993 Ishii et al. ..... 359/687
5,231,540 A * 7/1993 Shibata ..... 359/684
5,414,562 A * 5/1995 Ueda ..... 359/683
5,418,646 A * 5/1995 Shibata et al. ..... 359/687
5,546,231 A * 8/1996 Sato ..... 359/687
5,644,433 A * 7/1997 Ikari ..... 359/687
5,671,062 A 9/1997 Nakamura
6,016,228 A 1/2000 Uzawa
6,331,917 B1 * 12/2001 Ishii et al. ..... 359/687
6,535,339 B1 * 3/2003 Miyauchi ..... 359/687
6,587,281 B2 * 7/2003 Hozumi et al. ..... 359/687
6,744,571 B2 * 6/2004 Ishii et al. ..... 359/795

FOREIGN PATENT DOCUMENTS

JP 3-200113 * 9/1991
JP 4-43311 * 2/1992
JP 4-78806 * 3/1992
JP 6-094997 * 4/1994
JP 6-194572 * 7/1994
JP 10-062687 3/1998

* cited by examiner

*Primary Examiner*—David N Spector
(74) *Attorney, Agent, or Firm*—Pillsbury Winthrop Shaw Pittman LLP

(57) ABSTRACT

The invention provides a zoom lens system that is reduced in terms of both size and cost. The zoom lens system comprises a first positive lens group G1, a second negative lens group G2, a stop S, a third positive lens group G3 and a fourth positive lens group G4. During zooming from a wide-angle end to a telephoto end of the system, while the first lens group G1 remains fixed, the second lens group G2 moves from an object side to an image plane side of the system, the third lens group G3 moves from the image plane side to the object side, and the fourth lens group G4 moves to keep an image plane at a constant position. The first lens group G1 is made up of a negative meniscus lens convex on an object side and a double-convex lens, the second lens group G2 is made up of a double-concave lens and a positive meniscus lens convex on an object side thereof, with an aspherical surface being used for a surface of the positive meniscus lens that is located on an image side thereof, the third lens group G3 is made up of a double-convex lens and a negative meniscus lens convex on an object side thereof, with an aspherical surface being used for a surface of the double-convex lens that is located on an object side thereof, and the fourth lens group G4 is made up of one double-convex lens.

44 Claims, 13 Drawing Sheets

ZOOM LENS SYSTEM

Matter enclosed in heavy brackets [ ] appears in the original patent but forms no part of this reissue specification; matter printed in italics indicates the additions made by reissue.

*This is a reissue application of U.S. Pat. No. 6,185,048, which issued on Feb. 6, 2001, which relies for priority upon Japanese Patent Application No. 9-280758, filed Oct. 14, 1997, Japanese Patent Application No. 10-003215, filed Jan. 9, 1998, and Japanese Patent Application No. 10-244643, filed Aug. 31, 1998, the contents of all of which are incorporated herein by reference in their entireties.*

BACKGROUND OF THE INVENTION

1. Field of the Invention

The present invention relates generally to a zoom lens system, and more particularly to a compact yet low-cost zoom lens system used with cameras using an electronic image pickup means such as camcorders, digital cameras, etc.

2. Discussion of Related Art

To achieve size and weight reductions of a consumer-oriented zoom lens system in this field, a specific zoom lens system has been proposed, which comprises four lens groups, i.e., a positive lens group, a negative lens group, a positive lens group and a positive lens group in order from an object side thereof, as typically disclosed in JP-A's 4-43311 and 4-78806. For zooming, the second negative lens group moves on an optical axis while the first and third lens group remain fixed. The fourth lens group moves to make correction for a fluctuation in the position of an image plane in association with zooming. A further size reduction is achievable by a specific zoom lens system wherein, as typically disclosed in JP-A's 6-94997 and 6-194572, a third lens group moves from an image plane side to an object side of the system during zooming from a wide-angle end to a telephoto end of the system. Such zoom lens systems have a relatively high zoom ratio of the order of 8 to 12. However, these zooms lens systems are still insufficient for zoom lens systems having a lower zoom ratio while weight is placed on ever smaller size and ever lower cost, because of a large number of lenses.

In the zoom lens system disclosed in JP-A 6-94997, the first lens group consists of a negative lens, a positive lens and a positive lens, three in all; the second lens group consists of a negative lens, a negative lens and a positive lens, three in all; the third lens group consists of a positive lens, a positive lens and a negative lens, three in all or a positive lens and a negative lens, two in all; and the fourth lens consists of one positive lens. In the zoom lens system disclosed in JP-A 6-194572, the first lens group consists of a negative lens and a positive lens, two in all; the second lens group consists of a negative lens and a positive lens, two in all; the third lens group consists of one positive lens; and the fourth lens group consists of a negative lens and a positive lens, two in all. In either case, each of the second to fourth lens groups has one aspherical surface to reduce the number of lenses.

With reference here to the zoom lens system set forth in JP-A 6-94997, however, it is impossible to make the first lens group thin because the first lens group having the largest lens diameter is made up of three lenses. This in turn makes it difficult to achieve a further reduction in the lens diameter, because the height of a ray having the largest field angle and passing through the first lens group cannot be lowered. With reference then to the zoom lens system disclosed in JP-A 6-194572, the assistance of the third lens group in zooming is insufficient because the third lens group is made up of one positive lens alone. This in turn causes the burden of the zooming action on the first and second lens groups to become large, making sufficient size reductions difficult. Further, spherical aberrations, coma, astigmatism, etc. produced at the third lens group are likely to become large and, accordingly, fluctuations in various aberrations due to the zooming movement of the third lens group are likely to become large. Furthermore, the force of the third lens group to converge an axial bundle becomes weak and so an axial bundle incident on the fourth lens group becomes relatively close to a parallel bundle. This in turn causes coma and astigmatism produced at the fourth lens group to become large.

In the zoom lens systems set forth in JP-A's 6-94997 and 6-194572, a great part of the zooming action is shared by the second lens group. To keep an image point substantially constant in this cause, the lateral magnification of the second lens group must be in the range of about −1 from the wide-angle end to the telephoto end. At a zoom ratio lower than that, however, the amount of movement of the second lens group can become so small that size reductions can be achieved. It is thus efficient to reduce the space allowed between the first and second lens groups as much as possible for the purpose of size reductions.

To permit the second lens group to have a lateral magnification of about −1 while the space between the first and second lens groups is kept as narrow as possible, however, it is required to increase the power of the first lens group with respect to the second lens group. This then causes an entrance pupil to be located at a farther position where the height of an off-axis ray passing through the first lens group increases, resulting in an increase in the size of the lens system in the first lens group and, hence, an increase in the thickness of the lenses in the first lens group. Further, the curvature of each lens in the first lens group must be increased to make sure of the edge thickness of each lens, resulting in a further increase in the thickness of each lens in the first lens group.

SUMMARY OF THE INVENTION

In view of the aforesaid problems associated with the prior art, an object of the present invention is to achieve further size and cost reductions of such zoom lens systems.

One particular object of the present invention is to provide a zoom lens system comprising four lens groups, wherein size reductions are achieved without increasing the power of the first lens group with respect to the second lens group while satisfactory zoom ratios are maintained.

Another particular object of the present invention is to use a reduced number of lenses thereby achieving a compact zoom lens best suited for use with digital cameras, etc. This zoom lens system is designed to achieve a substantially telecentric emergent bundle while taking an image pickup element such as a CCD into consideration, and obtain such a back focus as to allow optical elements such as low-pass filters and bundle-splitting elements to be located in the system, if required. In addition, the capability of the zoom lens system to form images is considerably improved.

According to the first aspect of the present invention, the aforesaid objects are achieved by the provision of a zoom lens system comprising, in order from an object side thereof, a first lens group that has positive refracting power, a second lens group that has a negative refracting power and moves from the object side to an image plane side of the system during zooming from a wide-angle end to a telephoto end of the system, a third lens group that has positive refracting power and a fourth lens group that has positive refracting power and is movable during zooming, wherein:

said first group comprises two lenses, a negative lens and a positive lens or one positive lens alone, said third lens group comprises three lenses, a positive lens, a positive lens and a negative lens or two lenses, a positive lens and a negative lens, and said third lens group has at least one aspherical surface therein.

Preferably in this case, the positive and negative lenses in the third lens group are cemented together.

Preferably, the third lens group moves from the image plane side to the object side during zooming from the wide-angle end to the telephoto end.

Preferably, the first lens group remains fixed during zooming.

Preferably, the second lens group comprises two lenses, a negative lens and a positive lens in order from the object side.

Preferably, the fourth lens group comprises one positive lens alone.

Preferably, the zoom lens system satisfies the following condition (a):

$$0.3<|L_3|/|L_2|<1.0 \quad (a)$$

where $L_2$ is an amount of movement of the second lens group from the wide-angle end to the telephoto end, and $L_3$ is an amount of movement of the third lens group from the wide-angle end to the telephoto end.

Preferably, the second lens group has at least one aspherical surface therein.

Preferably, the fourth lens group has at least one aspherical surface therein.

According to the second aspect of the present invention, there is provided a zoom lens system comprising, in order from an object side thereof, a first lens group that has positive refracting power and remains fixed during zooming, a second lens group that has negative refracting power and moves from the object side to an image plane side of the system during zooming from a wide-angle end to a telephoto end of the system, a third lens group that has positive refracting power and moves from the image plane side to the object side during zooming from the wide-angle end to the telephoto end, and a fourth lens group that has positive refracting power and is movable during zooming, wherein:

said zoom lens system satisfies the following condition (1):

$$0.5<|F_2/F_3|<1.2 \quad (1)$$

where $F_1$ is a focal length of an i-th lens group.

According to the third aspect of the present invention, there is provided a zoom lens system comprising, in order from an object side thereof, a first lens group that has positive refracting power and remains fixed during zooming, a second lens group that has negative refracting power and moves from the object side to an image plane side of the system during zooming from a wide-angle end to a telephoto end of the system, a third lens group that has positive refracting power and moves from the image plane side to the object side during zooming from the wide-angle end to the telephoto end, and a fourth lens group that has positive refracting power and is movable during zooming, wherein:

said zoom lens system satisfies the following condition (2):

$$0.49<|L_3/L_2|<1 \quad (2)$$

where $L_i$ is an amount of movement of an i-th lens group from the wide-angle end to the telephoto end.

According to the fourth aspect of the present invention, there is provided a zoom lens system comprising, in order from an object side thereof, a first lens group that has positive refracting power and remains fixed during zooming, a second lens group that has negative refracting power and moves from the object side to an image plane side of the system during zooming from a wide-angle end to a telephoto end of the system, a third lens group that has positive refracting power and moves from the image plane side to the object side during zooming from the wide-angle end to the telephoto end, and a fourth lens group that has positive refracting power and is movable during zooming, wherein:

said zoom lens system satisfies the following condition (3):

$$2<(F_{3,4W})/IH<3.3 \quad (3)$$

where $(F_{3,4W})$ is a composite focal length of the third and fourth lens group, and IH is a radius of an image circle.

According to the fifth aspect of the present invention, there is provided a zoom lens system comprising, in order from an object side thereof, a first lens group that has positive refracting power, a second lens group that has negative refracting power and moves from the object side to an image plane side of the system during zooming from a wide-angle end to a telephoto end of the system, a third lens group that has positive refracting power and a fourth lens group that has positive refracting power and is movable during zooming, wherein:

said third lens group comprises, in order from an object side thereof, a positive lens convex on an object side thereof, and a doublet consisting of a positive lens convex on an object side thereof and a negative lens concave on an image plane side thereof, peripheries of object side-directed convex surfaces of both said object-side positive lens and said doublet in said third lens group are held by a lens holder barrel while said convex surfaces are abutting at said peripheries or some points on said lens holder barrel.

A detailed explanation will now be made of why the aforesaid arrangements are used, and how they work.

First of all, the zoom lens system according to the first aspect of the invention is described.

One possible approach to achieving a further side reduction of the zoom lens system disclosed in JP-A 6-94997 is to reduce the number of lenses used, thereby saving the space occupied by the lenses. In the system set forth in JP-A 6-94997, the fourth lens group consists of one positive lens, and the third lens group should comprise at least two lenses, a positive lens and a negative lens, because the negative lens is essentially required for correction of chromatic aberrations. In either case, there is no room for reducing the number of lenses. To reduce the number of lenses, the number of lenses in the first and second lens groups may be reduced. However, since each of the first and second lens groups should have one negative lens and one positive lens for correction of chromatic aberrations, it is the positive lens in the first lens group or the negative lens in the second lens group that can be eliminated. The greatest effect on size and cost reductions is obtained when the positive lens is removed from the first lens group, because that positive lens has a large diameter and a large thickness.

In the present invention, therefore, the first lens group is made up of two lenses, a negative lens and a positive lens. Further size and weight reductions may be achieved by constructing the second lens group of two lenses, a negative lens and a positive lens. Various aberrations can be reduced by constructing the third lens group of three lenses, a positive lens, a positive lens and a negative lens or two lenses, a positive lens and a negative lens, so that a great part of the zooming action can be shared by the third lens group. Consequently, the burden of the zooming action and correction of aberrations on the first and second lens groups can be relieved.

In addition, the power of the third lens group can be so increased that an axial bundle incident on the fourth lens group can be relatively largely converged. It is thus possible to reduce coma and astigmatism produced at the fourth lens group and, at the same time, achieve size reductions by a limited back focus. If the third lens group has a positive-negative power profile in order from the object side, a principal point throughout the third and fourth lens group, which define a so-called relay system, can then be shifted more closely to the object side. It is thus possible to shorten a composite focal length of the third and fourth lens groups with no variation in the image-forming magnification of the third and fourth lens groups and, hence, the overall length of the zoom lens system.

In the present invention, the fourth lens group can be made up of one positive lens alone, partly because chromatic aberrations produced throughout the third and fourth lens groups can be fully corrected by one negative lens in the third lens group, and partly because the power of the third lens group can be increased as mentioned above to relieve the burden of correction of aberrations that is imposed on the fourth lens group. This is also desired in view of size and weight reductions. Generally, a zoom lens system such as one contemplated in the present invention is designed to move forward the fourth lens group for focusing. According to the present invention, the load on focusing operation, too, can be reduced.

In the present invention, the amount of aberrations produced at the first and second lens groups is likely to become larger than that in the zoom lens system set forth in JP-A 6-94997 because each of the first and second lens groups comprise a reduced number of lenses. It is thus desired that the burden of the zooming action be shared by the third lens group as much as possible and, accordingly, the burden on the first and second lens groups be relieved. In other words, it is desired that the zoom lens system of the invention satisfy the following condition (a) with respect to zooming:

$$0.3<|L_3|/|L_2|<1.0 \quad \text{(a)}$$

where $L_2$ is the amount of movement of the second lens group during zooming, and $L_3$ is the amount of movement of the third lens group during zooming. Thus, condition (a) defines the proportion of the amount of movement of the third lens group to the amount of movement of the second lens group. When the lower limit of 0.3 in condition (a) is not reached, the zooming action shared by the third lens group becomes too slender or the burden on the second lens group becomes too large, resulting in a deterioration in aberrations or failing to achieve compactness. When the upper limit of 1.0 is exceeded, on the other hand, the burden on the third lens group becomes too large, again resulting in a deterioration in aberrations.

In the zoom lens system of the invention, it is required that at least one surface in the third lens group be made up of an aspherical surface with positive power becoming weak farther off the optical axis so as to make correction for spherical aberrations, and especially coma and astigmatism at the wide-angle end. By constructing at least one surface in the second lens group of an aspherical surface with negative power becoming weak farther off the optical axis, it is also possible to make better correction for coma and astigmatism, and spherical aberrations at the telephoto end.

By applying to at least one surface in the fourth lens group an aspherical surface with positive power becoming weak farther off the optical axis, it is possible to make ever better correction for astigmatism in particular, etc.

Then, the second to fifth embodiments of the zoom lens system according to the invention are explained.

In the field of cameras with built-in electronic image pickup means such as camcorders, and digital cameras, too, demand for consumer-oriented, compact yet low-cost zoom lens systems has gone up recently. To meet such demand, JP-A's 6-94997 and 6-194572 have come up with such zoom lens systems as already noted. As previously mentioned, these have a zoom ratio of the order of 8 to 12, and a great part of the zooming action is shared by the second lens group. To keep an image point substantially constant in this case, the lateral magnification of the second lens group must be within the range of about −1 from the wide-angle end to the telephoto end.

At a zoom ratio lower than that, however, the amount of movement of the second lens group can become so small that size reductions can be achieved. It is thus efficient to reduce the space allowed between the first and second lens groups as much as possible for the purpose of size reductions.

To permit the second lens group to have a lateral magnification of about −1 while the space between the first and second lens groups is kept as narrow as possible, however, it is required to increase the power of the first lens group with respect to the second lens group. This then causes an entrance pupil to be located at a farther position where the height of an off-axis ray passing through the first lens group increases, resulting in an increase in the size of the lens system in the first lens group and, hence, an increase in the thickness of the lenses in the first lens group. Further, the curvature of each lens in the first lens group must be increased to make sure of the edge thickness of each lens, resulting in a further increase in the thickness of each lens in the first lens group.

In accordance with the second embodiment of the zoom lens system of the present invention, this problem can be averted by allocating a great part of the burden of the zooming action to the third lens group, whereby a satisfactory zoom ratio and compactness are achieved with no considerable change in the power ratio between the first and second lens group. To allow the third lens group to have a great zooming action, it is then required that the third lens group have relatively large power, as defined by condition (1). When the lower limit of 0.5 in condition (1) is not reached or when the power of the third lens group becomes weak with respect to the power of the second lens group, the amount of movement of the third lens group during zooming becomes too large. With this, the amount of movement of the second lens group to keep the image plane at a constant position becomes large, failing to achieve compactness. When the upper limit of 1.2 is exceeded or when the power of the third lens group with respect to the second lens group becomes too strong, the amount of astigmatism produced at the third lens group becomes too large, and the distance between the third lens group and an object point therefor becomes too short. This in turn makes it impossible to provide a sufficient space between the second and third lens groups. More preferably, this embodiment of the zoom lens system should satisfy the following condition (4):

$$0.6<|F_2/F_3|<1 \quad (4)$$

For the third embodiment of the zoom lens system according to the present invention, it is required that the amount of movement of the third lens group during zooming be increased so as to allocate a relatively large zooming action to the third lens group, as defined by condition (2). Thus, condition (2) gives a definition of the ratio of the amount of movement between the second and third lens groups from the wide-angle end to the telephoto end. Falling below the lower limit of 0.49 in condition (2) is not preferable because the amount of movement of the third lens group with respect to the second lens group becomes too small to allocate a sufficient zooming action to the third lens group. Exceeding the upper limit of 1 is again not preferable because the amount of movement of the third lens group with respect to the second lens group increases with the results that there is an excessive fluctuation in astigmatism, coma and other aberrations produced at the third lens group during zooming while the distance between the third lens group and an object point therefor at the telephoto end becomes too short. Consequently, no sufficient space can be provided between the second and third lens groups.

For a four-lens-group or a positive-negative-positive-positive power profile zoom lens system like the fourth embodiment of the zoom lens system according to the present invention, it is required to increase the composite power of the third and fourth lens groups, as defined by condition (3). This is because it is effective for reducing the overall length of the zoom lens system that the powers of the third and fourth lens groups for relaying a virtual image formed by the first and second lens groups to an image pickup plane be increased to reduce the distance between the position of the virtual image by the first and second lens groups and the image pickup plane. When the upper limit of 3.3 in condition (3) is exceeded or when the composite focal length of the third and fourth lens groups at the wide-angle end becomes large relative to the radius of the image circle (image height) IH (when the power becomes weak), no sufficient compactness is achieved for the aforesaid reason. Falling below the lower limit of 2 in condition (3) is not preferred. This is because the composite focal length of the third and fourth lens groups at the wide-angle end becomes small relative to the radius of the image circle with the results that astigmatism produced at the third and fourth lens groups becomes too large, while the distance between the third lens group and an object point therefor becomes too short. Consequently, no sufficient space can be provided between the second and third lens groups.

For a zoom lens system such as one contemplated in the present invention, it is preferable to perform focusing with the fourth lens group when the angle of incidence of an axial bundle is relatively small, because aberrational fluctuations during focusing are limited. Since the fourth lens group has a relatively small lens diameter and is light in weight, there is an additional advantage that the driving torque for focusing can be reduced.

It is also favorable for reducing the overall length of the zoom lens system that as much of the composite power of the third and fourth lens groups as possible is allocated to the third lens group. In this embodiment, therefore, relatively large power is allocated to the third lens group rather than to the fourth lens group, as defined by the following condition (5) giving a definition of the ratio of the focal length of the third lens group with respect to the focal length of the fourth lens group.

$$0.3<F_3/F_4<0.8 \quad (5)$$

where $F_i$ is a focal length of an i-th lens group. By meeting condition (5) or making the ratio of the focal length of the third lens group with respect to the focal length of the fourth lens group smaller than the upper limit of 0.8 therein, it is possible to achieve more compactness than would be possible with the prior art. Falling below the lower limit of 0.3 in condition (5) is not preferable because the ratio of the focal length of the third lens group with respect to the focal length of the fourth lens becomes small, with the results that the power of the fourth lens group becomes too weak, and the amount of movement of the fourth lens group for focusing becomes too large. There is thus a large aberrational fluctuation in association with focusing.

In the present invention, the power of the fourth lens group is relatively weaker than that of the third group; that is, it is desired for achieving compactness to construct the fourth lens group of one positive lens.

To reduce an astigmatism fluctuation due to zooming, it is desired that at least one surface in the fourth lens group be provided by an aspherical surface.

Preferably in the present invention, the following condition (6) is satisfied:

$$0.4<|\beta_{2T}|<1 \quad (6)$$

Here $\beta_{2T}$ is a lateral magnification of the second lens group at the telephoto end.

Condition (6) gives a definition of the absolute value of the lateral magnification of the second lens group at the telephoto end. When the lower limit of 0.4 is not reached or when the absolute value of the lateral magnification of the second lens group at the telephoto end becomes small, no lens compactness can be achieved because the zooming action of the second lens group becomes insufficient, and the power of the first lens group becomes too weak. When the upper limit of 1 is exceeded or when the absolute value of the lateral magnification of the second lens group at the telephoto end becomes large, no compactness can again be achieved because the zooming action of the third lens group becomes insufficient, and the power of the first lens group becomes too strong, resulting an increase in the size of the lens system in the first lens group.

Preferably, the third lens group contributes to a size reduction of the zoom lens system by increasing its power without varying its image-forming magnification. It is then preferable that the principal point of the third lens group is located as close to the object side as possible, thereby avoiding interference between the second and third lens groups at the telephoto end of the system, which may be caused when the distance between the third lens group and an object point for the third lens group is short. For this reason, it is preferable that the third lens group is made up of three lenses or, in order from an object side thereof, a positive lens, a positive lens and a negative lens. To make correction for spherical aberrations, it is further preferable that an aspherical surface is used for at least one surface in the third lens group.

By using an aspherical surface for at least one surface in the second lens group, it is possible to make better correction for fluctuations in astigmatism and coma in association with zooming.

In the present invention, the burden of correction of aberrations on the first and second lens groups can be relieved because the third lens group shares a relatively great part of the zooming action as previously mentioned, and so the first lens group may be made up of one positive lens. It is then preferable that the lens in the second lens group that is located nearest to an object side thereof is made up of a negative lens having relatively large dispersion so as to make correction for chromatic aberration of magnification produced at the first lens group. This is defined by the following condition (7) that gives a definition of the Abbe's number of the negative lens in the second lens group that is located nearest to the object side thereof.

$$\nu_{21}<40 \tag{7}$$

where $\nu_{21}$ is an Abbe's number of negative lens in the second lens group that is located nearest to the object side thereof.

To make correction for chromatic aberration of magnification produced at the positive lens in the first lens group as mentioned above, it is preferable that the Abbe's number of the negative lens located nearest to the object side of the second lens group does not exceed the upper limit of 40 in condition (7). If the following condition (8) is satisfied, it is then possible to make better correction for the chromatic aberration of magnification.

$$\nu_{21}<35 \tag{8}$$

When, as contemplated in the invention, the third lens group is made up of three lenses, i.e., a positive lens, a positive lens and a negative lens in order from an object side thereof, a principal point throughout the third lens group should be located as close to the object side as possible for the achievement of compactness. It is then preferable that both the positive lenses are convex on object sides thereof and the negative lens is strongly concave on an image plane side thereof. The performance of the convex surfaces (opposing to the object side) of the two positive lenses having strong refracting power and the performance of the concave surface (opposing to the image side) of the negative lens are often adversely affected by an error of decentration of such lenses with respect to optical axes at the time of lens fabrication. For this reason, it is preferable that the positive lens on the image plane side and negative lens are cemented together, and that when the third lens group is held in a lens holder barrel, the positive lens on the object side and the doublet are held by the lens holder barrel while their convex surfaces opposing to the object side are abutting at their peripheries or some points on the lens holder barrel.

According to one specific aspect of the present invention, there is provided a zoom lens system comprising, in order from an object side of the system, a first lens group that has positive refracting power and remains fixed during zooming, a second lens group that has negative refracting power and moves from the object side to an image plane side of the system during zooming from a wide-angle end to a telephoto end of the system, a third lens group that has positive refracting power and moves constantly from the image plane side to the object side during zooming from the wide-angle end to the telephoto end and a fourth lens group that has positive refracting power and is movable during zooming, wherein said third lens group comprises a doublet consisting of a positive lens and a negative lens, and said fourth lens group comprises one positive lens.

In this embodiment, during zooming from the wide-angle end to the telephoto end, the second lens group having negative refracting power can move from the object side to the image plane side while the third lens group having positive refracting power can move from the image plane side to the object side, so that the burden of zooming so far shared by the second lens group can be allocated to the second and third lens groups. It is thus possible to achieve compactness while a satisfactory zoom ratio is maintained, without increasing the power ratio of the first lens group to the second lens group. In other words, by allocating a great part of the zooming action to the third lens group, it is possible to achieve compactness while a satisfactory zoom ratio is maintained, without increasing the power ratio of the first lens group to the second lens group.

Reference is then made to what action and effect are obtained when the third lens group comprises a doublet consisting of a positive lens and a negative lens. When the third lens group is designed as a group movable during zooming, the burden on the third lens group of correction of aberrational fluctuations in association with zooming does not only become heavy, but it is also required to make good correction for chromatic aberrations. For this reason, it is necessary for the third lens group to comprise at least a positive lens component and a negative lens component. Relative decentration between the positive and negative lenses gives rise to a considerable deterioration in the image-forming capability. This decentration between the positive and negative lenses can be easily reduced by using the doublet consisting of a positive lens and a negative lens in the third lens group. It is thus possible to allocate a great part of the zooming action to the third lens group, make good correction for chromatic aberrations, and make an image quality drop due to decentration unlikely to occur. In this embodiment, the burden of zooming so far shared by the second lens group is allocated to the second and third lens groups so that the burden of correction of aberrations on the fourth lens group can be successfully reduced. By constructing the fourth lens group of one positive lens, it is possible to achieve compactness while the image-forming capability is kept.

In the instant embodiment, it is preferable that an aspherical surface is used for at least one surface of the positive lens in the fourth lens group.

When the fourth lens group is constructed of one positive lens, it is preferable that the fourth lens group has one aspherical surface therein because the burden of zooming can be allocated to the second and third lens groups and correction of aberrations shared by the fourth lens group can be well performed, resulting in the achievement of cost and size reductions. It is here to be noted that the aspherical surface may be formed by a so-called glass pressing process, a so-called hybrid process wherein a thin resin layer is stacked on a glass or other substrate, or a plastic molding process.

According to another specific aspect of the present invention, there is provided a zoom lens system comprising, in order from an object side of the system, a first lens group that has positive refracting power and remains fixed during zooming, a second lens group that has negative refracting power and moves from the object side to an image plane side of the system during zooming from a wide-angle end to a telephoto end of the system, a third lens group that has positive refracting power and moves constantly from the image plane side to the object side during zooming from the wide-angle end of the telephoto end and a fourth lens group that has positive refracting power and is movable during zooming, wherein each of said recovery lens group and said third lens group comprises a doublet consisting of a positive lens and a negative lens.

In this embodiment, during zooming from the wide-angle end to the telephoto end, the second lens group having negative refracting power can move from the object side to the image plane side while the third lens group having positive refracting power can move from the image plane side to the object side, so that the burden of zooming so far shared by the second lens group can be allocated to the second and third lens groups. It is thus possible to achieve compactness while a satisfactory zoom ratio is maintained, without increasing the power ratio of the first lens group to the second lens group. In other words, by allocating a great part of the zooming action to the third lens group, it is possible to achieve compactness while a satisfactory zoom ratio is maintained, without increasing the power ratio of the first lens group to the second lens group.

Reference is then made to what action and effect are obtained when the third lens group comprises a doublet consisting of a positive lens and a negative lens. When the third lens group is designed as a group movable during zooming, the burden on the third lens group of correction of aberration fluctuations in associated with zooming does not only become heavy, but it is also required to make good correction for chromatic aberrations. For this reason, it is necessary for the third lens group to comprise at least a positive lens component and a negative lens component. Relative decentration between the positive and negative lenses then gives rise to a considerable deterioration in the image-forming capability. This decentration between the positive and negative lenses can be easily reduced by using the doublet consisting of a positive lens and a negative lens in the third lens group. It is thus possible to allocate a great part of the zooming action to the third lens group, make good correction for chromatic aberrations, and make an image quality drop due to decentration unlikely to occur. Although the burden of zooming on the second lens group is reduced, yet the burden on the second lens group of correction of aberrational fluctuations in association with zooming is still heavy because the second lens group is a group movable during zooming. It is thus required to make good correction for chromatic aberrations. For this reason, it is necessary for the second lens group to comprise at least a positive lens component and a negative lens component. Relative decentration between the positive and negative lenses then gives rise to a considerable deterioration in the image-forming capability. This decentration between the positive and negative lenses can be easily reduced by using the doublet consisting of a positive lens and a negative lens in the second lens group. It is thus possible to make an image quality drop due to decentration unlikely to occur.

According to yet another specific embodiment of the present invention, there is provided a zoom lens system comprising, in order from an object side of the system, a first lens group that has positive refracting power and remains fixed during zooming, a second lens group that has negative refracting power and moves from the object side to an image plane side of the system during zooming from a wide-angle end to a telephoto end of the system, a third lens group that has positive refracting power and moves constantly from the image plane side to the object side during zooming from the wide-angle end to the telephoto end and a fourth lens group that has positive refracting power and is movable during zooming, wherein said third lens group comprises, in order from an object side thereof, a positive lens and a doublet consisting of a positive lens and a negative lens.

In this embodiment, during zooming from the wide-angle end to the telephoto end, the second lens group having negative refracting power can move from the object side to the image plane side while the third lens group having positive refracting power can move from the image plane side to the object side, so that the burden of zooming so far shared by the second lens group can be allocated to the second and third lens groups. It is thus possible to achieve compactness while a satisfactory zoom ratio is maintained, without increasing the power ratio of the first lens group to the second lens group. In other words, by allocating a great part of the zooming action to the third lens group, it is possible to achieve compactness while a satisfactory zoom ratio is maintained, without increasing the power ratio of the first lens group to the second lens group. Further, since the third lens group is made up of, in order from the object side, a positive lens, a positive lens and a negative lens, a principal point throughout the third lens group can be located on the object side for the achievement of a further size reduction. Stated otherwise, the negative lens is required for correction of chromatic aberration, and two positive lenses are located to obtain strong positive power and achieve a size reduction (simple structure) of the third lens group itself. Furthermore, this power profile (positive-positive-negative in order from the object side) of third lens group allows various aberrations to be well corrected with a reduced number of lenses. In addition, the principal point throughout the third lens group is located on the object side so that the principal point positions of the second and third lens groups can effectively be brought close to each other at the telephoto end of the system, thereby achieving a further size reduction of the system.

According to a further specific aspect of the present invention, there is provided a zoom lens system comprising, in order from an object side of said system, a first lens group having positive refracting power, a second lens group having negative refracting power, a third lens group having positive refracting power and a fourth lens group having positive refracting power, wherein during zooming, a space between said first and second lens groups, a space between said second and third lens groups and a space between said third and fourth lens groups vary independently, said third lens group comprises, in order from an object side thereof, a double-convex positive lens, and a doublet consisting of a positive meniscus lens convex on an object side thereof and a negative meniscus lens, and said fourth lens group comprises a double-convex lens having a large curvature on an object side surface thereof.

In this embodiment, the third lens group is constructed of, in order from the object side, a positive lens convex on an object side thereof and a doublet consisting of a positive meniscus lens convex on an object side thereof and a negative meniscus lens, so that a principal object throughout the third lens group can be located closer to the object side, thereby achieving a size reduction of the lens system. Use of the doublet consisting of a positive meniscus lens and a negative meniscus lens can reduce a performance drop due to decentration. Since the third lens group has such an arrangement, the fourth lens group can be constructed of one single lens. By using a double-convex lens having a large curvature on an object side thereof as the single lens, it is possible to make a light ray incident on the image plane substantially telecentric and obtain a satisfactory back focus while the number of lenses in the third and fourth lens groups is reduced to the minimum, thereby achieving the aforesaid another object of the present invention.

According to a still further specific aspect of the present invention, there is provided a zoom lens system comprising, in order from an object side of said system, a first lens group having positive refracting power, a second lens group having negative refracting power, a third lens group having positive refracting power and a fourth lens group having positive refracting power, wherein during zooming, a space between said first and second lens groups, a space between said second and third lens groups and a space between said third and fourth lens groups vary independently, said first lens group comprises one positive lens, said second lens group comprise three lenses or, in order from an object side thereof, a single lens and a doublet consisting of a negative lens and a positive lens, said third lens group comprises three lenses or, in order from an object side thereof, a single lens and a doublet consisting of a positive lens and a negative lens, and said fourth lens group comprises one positive lens.

With this arrangement, it is possible to achieve a positive-negative-positive-positive power profile zoom lens system that can have good image-forming capability with a reduced number of lenses and so can be well suited for use with digital cameras. By allowing the burden of correction of aberrations to be concentrated on the second and third lens groups, each of the first and fourth lens groups taking no great part in correction of aberrations can be constructed of one positive lens. By allowing the second lens group sharing a great part of correction of aberrations to be constructed of, in order from the object side, a single lens and a doublet consisting of a negative lens and a positive lens, it is possible to reduce, with a minimum number of lenses, various aberrations inclusive of chromatic aberrations produced at the second lens group alone, thereby achieving a further size reduction. Use of the doublet consisting of a negative lens and a positive lens in the second lens group can reduce a performance drop due to decentration. By allowing the third lens group sharing a great part of the burden of correction of aberrations to be constructed of, in order from the object side, a single lens and a doublet consisting of a positive lens and a negative lens, it is possible to reduce, with a minimum number of lenses, various aberrations inclusive of chromatic aberrations produced at the third lens group alone, thereby achieving a further size reduction. Use of the doublet consisting of a positive lens and a negative lens in the third lens group can reduce a performance drop due to decentration.

In this embodiment, it is preferable to make the power of the first lens group weak because the amount of aberrations produced at the first lens group can be so reduced that the burden of correction of aberrations produced at the first lens group on the second and third lens groups can be relieved. Further, it is preferable that this embodiment satisfies the following condition (9):

$$8<F_1/IH<20 \quad (9)$$

where $F_1$ is a focal length of the first lens group, and IH is an image height (a length from the center to the periphery of an image or the radius of an image circle). Falling below the lower limit of 8 in condition (9) is not preferable because the amount of aberrations produced at the first lens group increases. When the upper limit of 20 is exceeded, on the other hand, the power of the first lens group becomes weak, failing to obtain a satisfactory zoom ratio or achieve size reductions.

According to a still further specific aspect of the present invention, there is provided a zoom lens system comprising, in order from an object side of said system, a first lens group having positive refracting power, a second lens group having negative refracting power, a third lens group having positive refracting power and a fourth lens group having positive refracting power, wherein during zooming, a space between said first and second lens groups, a space between said second and third lens groups and a space between said third and fourth lens groups vary independently, said first lens group comprises two lenses or a positive lens and a negative lens, and said second or third lens group comprises a doublet consisting of at least one set of a positive lens and a negative lens.

In this embodiment, the first lens group is constructed of two lenses, i.e., a positive lens and a negative lens, whereby chromatic aberrations produced at the first lens group can be reduced irrespective of the power of the first lens group. This in turn allows the subsequent burden of correction of aberrations to be relieved, resulting in a size reduction of the optical system. By using the doublet consisting of a positive lens and a negative lens in the second or third lens group, it is then possible to reduce chromatic aberrations produced at other lens groups and prevent a deterioration in the image-forming capability due to decentration, etc. Consequently, it is possible to achieve an optical system favorable in view of the number of lenses, fabrication cost, and size reductions.

Still other objects and advantages of the invention will be part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 16 of the zoom lens system according to the present invention are given. Lens data regarding the zoom lens system of each example will be given later.

Figure 1:
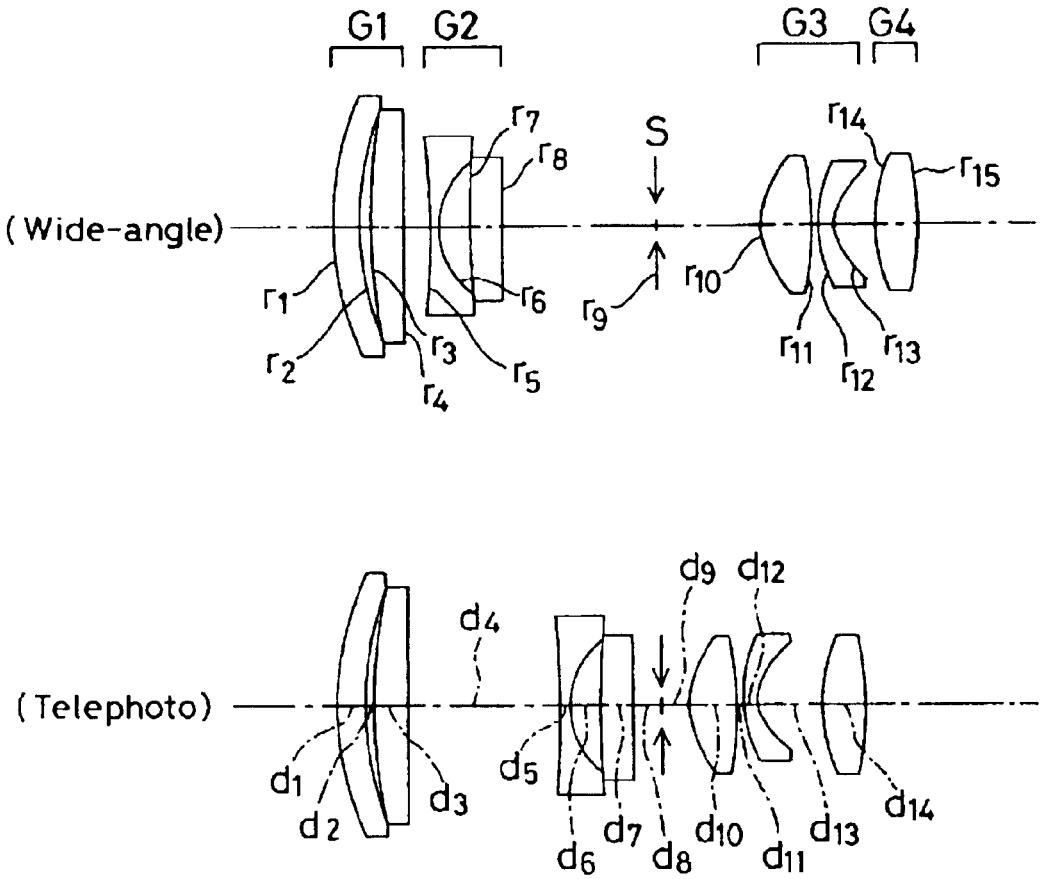
FIG. 1 is a sectional schematic of Example 1 of the zoom lens according to the invention.

FIG. 1 is a schematic illustrative of one sectional arrangement of Example 1. Example 1 is made up of, in order from an object side thereof, a first positive lens group G1, a second negative lens group G2, a stop S, a third positive lens group G3, and a fourth positive lens group G4. The first lens group G1 remains fixed during zooming, the second lens group G2 moves from the object side to an image plane side of the system during zooming from a wide-angle end thereof to a telephoto end thereof, the third lens group G3 moves from the image plane side to the object side during zooming from the wide-angle end to the telephoto end, and the fourth lens group G4 moves to keep an image plane at a constant position during zooming.

The first lens group G1 is made up of, in order from an object side thereof, a negative meniscus lens convex on an object side thereof and a double-convex lens. The two lenses are separated from each other. The second lens group G2 is made up of, in order from an object side thereof, a double-concave lens and a positive meniscus lens convex on an object side thereof, with an aspherical surface being used for an image-side surface of the positive meniscus lens. The third lens group G3 is made up of, in order from an object side thereof, a double-convex lens and a negative meniscus lens convex on an object side thereof, with an aspherical surface being used for an object-side surface of the double-convex lens. The fourth lens group G4 is made up of one double-convex lens. Also, the zoom lens system of Example 1 satisfies the aforesaid condition (a).

Figure 2:
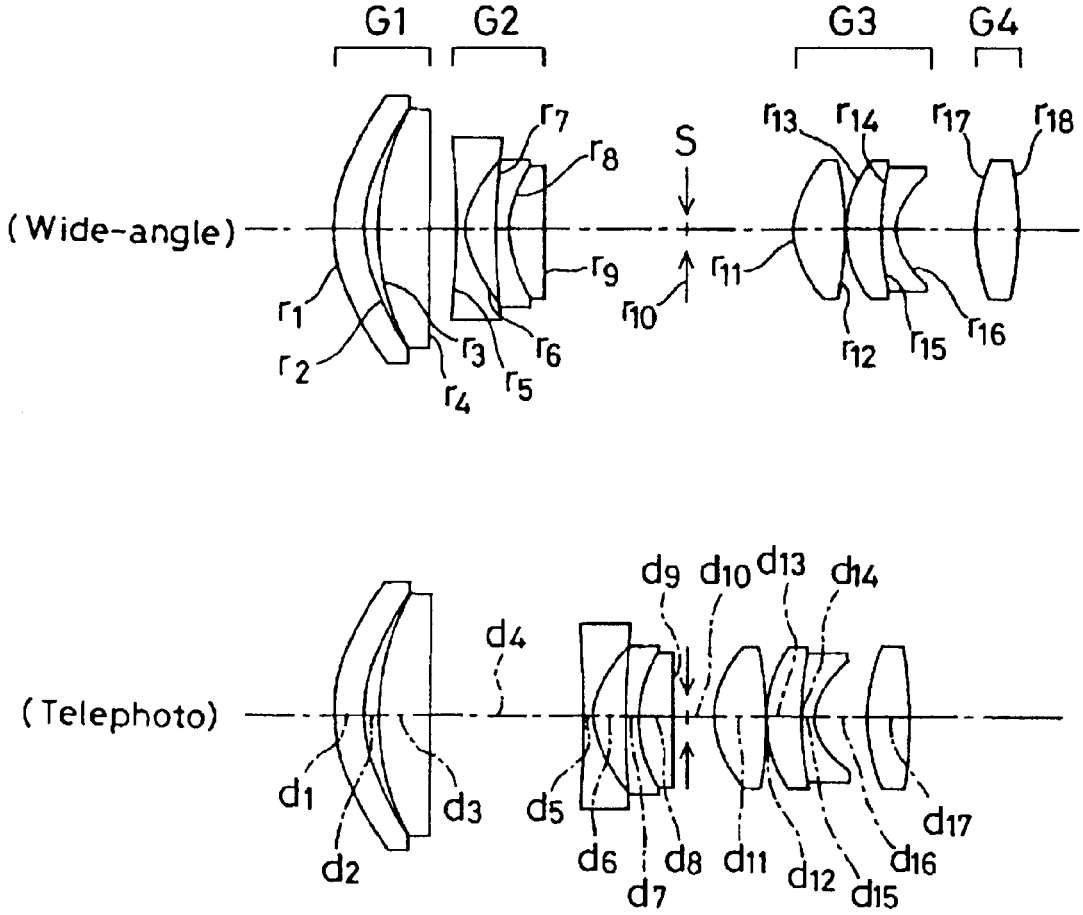
FIG. 2 is a sectional schematic of Example 2 of the zoom lens according to the invention.

FIG. 2 is a schematic illustrative of one lens arrangement of Example 2. The overall power profile and zooming movements in Example 2 are the same as in Example 1.

A first lens group G1 is made up of, in order from an object side thereof, a negative meniscus lens convex on object side thereof, and a double-convex lens. The two lenses are separated from each other. A second lens group G2 is made up of, in order from an object side thereof, a double-concave lens, a negative meniscus lens convex on an object side thereof, and a positive meniscus lens convex on an object side thereof. The negative and positive meniscus lenses are cemented together, with an aspherical surface being used for an image-side surface of the positive meniscus lens. A third lens group G3 is made up of, in order from an object side thereof, a double-convex lens, a positive meniscus lens convex on an object side thereof, and a negative meniscus lens convex on an object side thereof. The positive and negative meniscus lenses are cemented together, with an aspherical surface being used for an object-side surface of the double-convex lens. A fourth lens group G4 is made up of one double-convex lens. Also, the zoom lens system of Example 2 satisfies the aforesaid condition (a).

Figure 3:
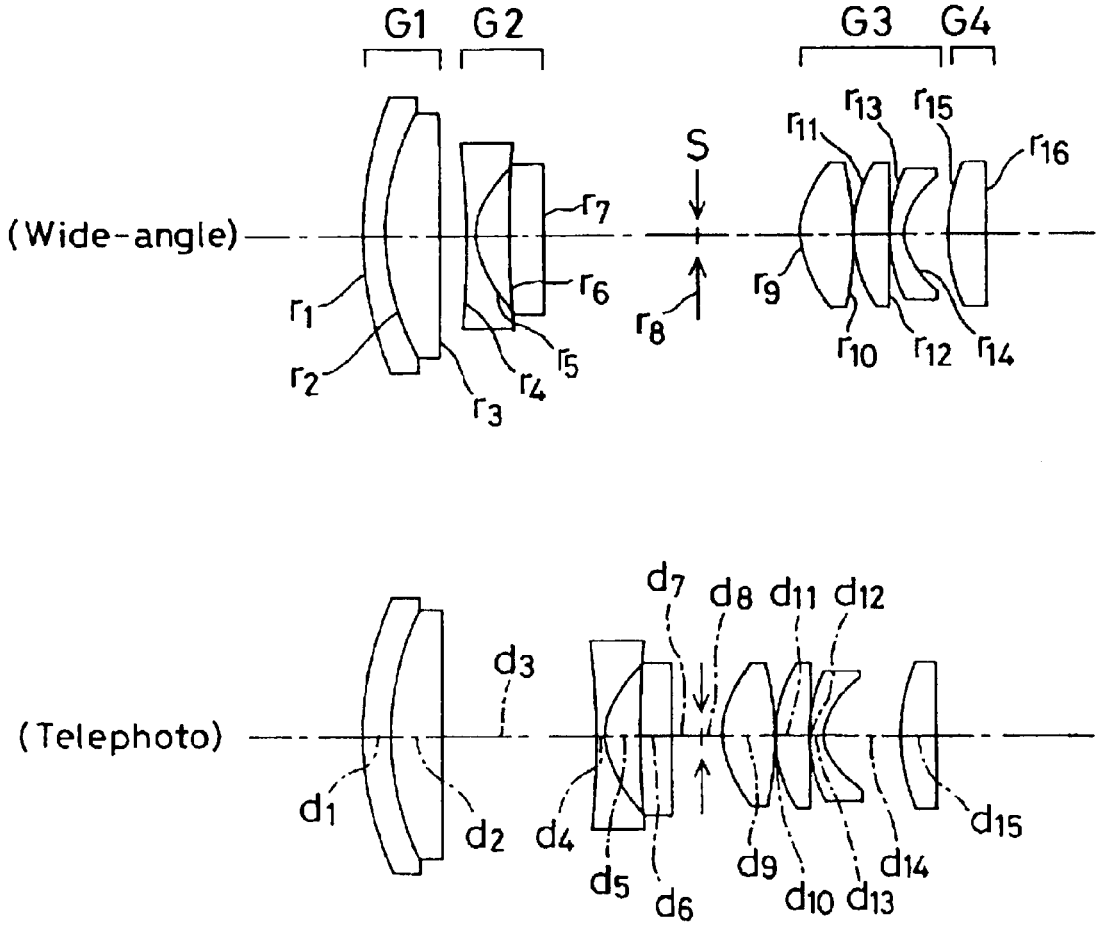
FIG. 3 is a sectional schematic of Example 3 of the zoom lens according to the invention.

FIG. 3 is a schematic illustrative of one lens arrangement of Example 3. The overall power profile and zooming movements in Example 3 are the same as in Example 1.

A first lens group G1 is made up of, in order from an object side thereof, a negative meniscus lens convex on an object side thereof, and a double-convex lens. The two lenses are cemented together. A second lens group G2 is made up of, in order from an object side thereof, a double-concave lens, and a positive lens, with an aspherical surface being used for an image-side surface of the positive lens. A third lens group G3 is made up of, in order from an object side thereof, a double-convex lens, a positive meniscus lens convex on an object side thereof, and a negative meniscus lens convex on an object side thereof, with an aspherical surface being used for an object-side surface of the double-convex lens. A fourth lens group G4 is made up of one double-convex lens, with an aspherical surface being used for an object-side surface thereof. Also, the zoom lens system of Example 3 satisfies the aforesaid condition (a).

Figure 4:
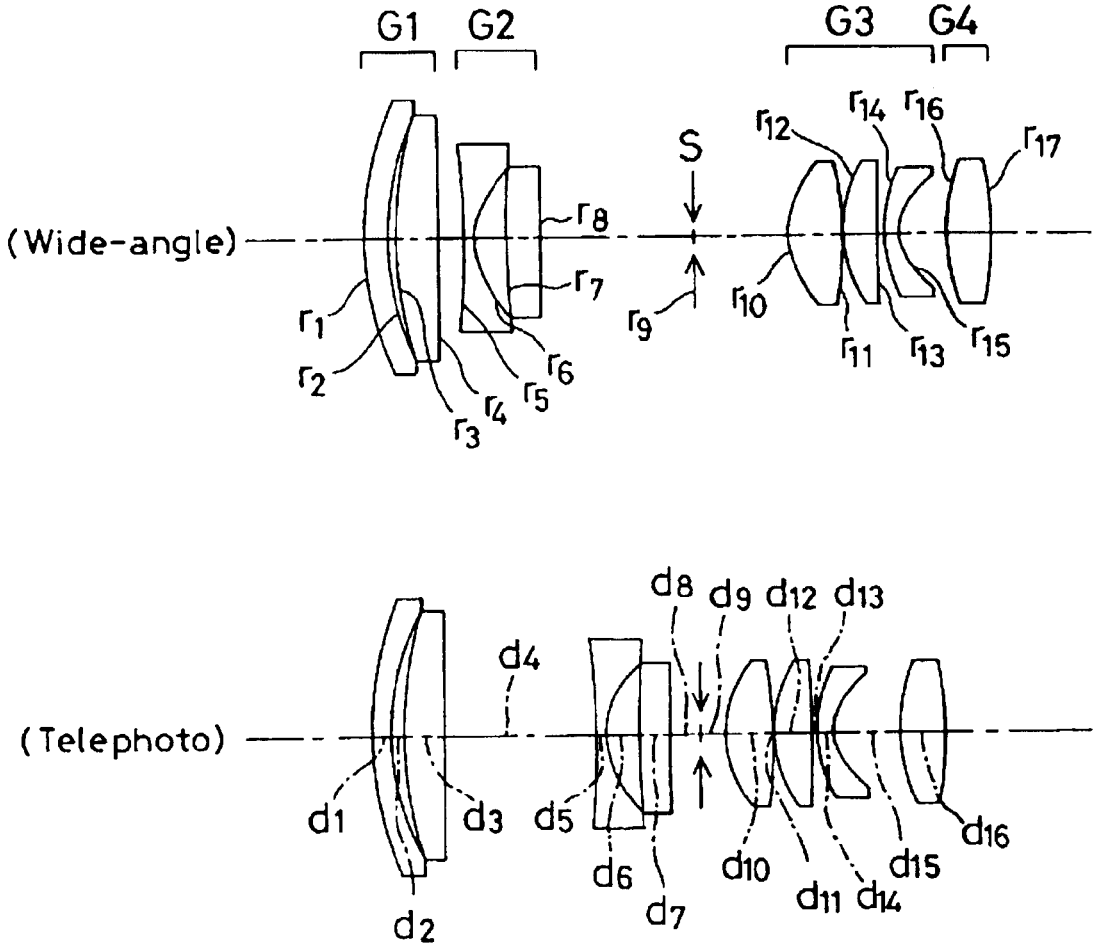
FIG. 4 is a sectional schematic of Example 4 of the zoom lens according to the invention.

FIG. 4 is a schematic illustrative of one lens arrangement of Example 4. The overall power profile and zooming movements in Example 4 are the same as in Example 1.

A first lens group G1 is made up of, in order from an object side thereof, a negative meniscus lens convex on an object side thereof, and a double-convex lens. The two lenses are separated from each other. A second lens group G2 is made up of, in order from an object side thereof, a double-concave lens, and a positive meniscus lens convex on an object side thereof, with an aspherical surface being used for an image-side surface of the positive meniscus lens. A third lens group G3 is made up of, in order from an object side thereof, a double-convex lens, a positive meniscus lens convex on an object side thereof, and a negative meniscus lens convex on an object side thereof, with an aspherical surface being used for an object-side surface of the double-convex lens. A fourth lens group G4 is made up of one double-convex lens. Also, the zoom lens system of Example 4 satisfies the aforesaid condition (a).

Figure 5:
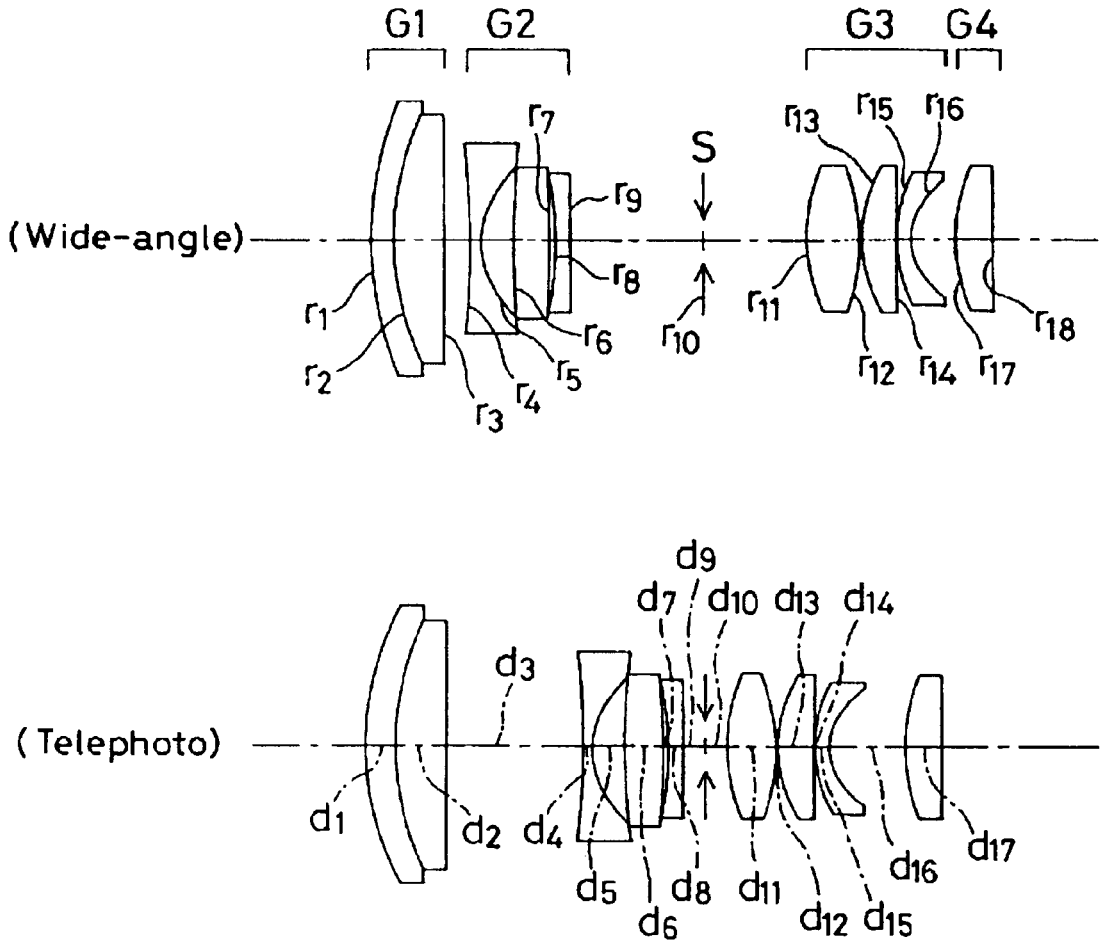
FIG. 5 is a sectional schematic of Example 5 of the zoom lens according to the invention.

FIG. 5 is a schematic illustrative of one lens arrangement of Example 5. The overall power profile and zooming movements in Example 5 are the same as in Example 1.

A first lens group G1 is made up of, in order from an object side thereof, a negative meniscus lens convex on an object side thereof, and a double-convex lens. The two lenses are cemented together. A second lens group G2 is made up of, in order from an object side thereof, a double-concave lens, a positive lens, and a double-concave lens, with an aspherical surface being used for an image-side surface of the positive lens. A third lens group G3 is made up of, in order from an object side thereof, a double-convex lens, a positive meniscus lens convex on an object side thereof, and a negative meniscus lens convex on an object side thereof, with an aspherical surface being used for an object-side surface of the double-convex lens. A fourth lens group G4 is made up of one positive meniscus lens convex on an object side thereof, with an aspherical surface being used for an object-side surface thereof. Also, the zoom lens system of Example 5 satisfies the aforesaid condition (a).

Figure 6:
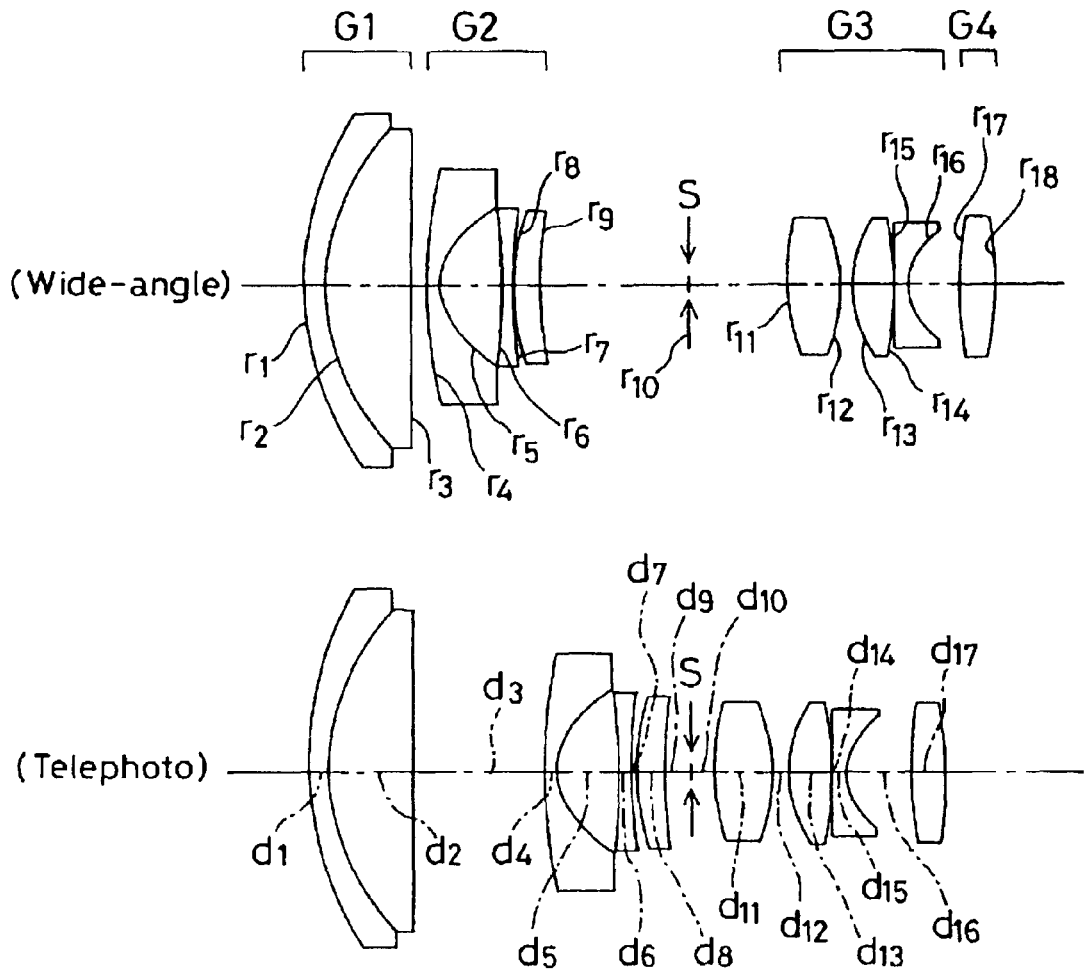
FIG. 6 is a sectional schematic of Example 6 of the zoom lens according to the invention.

FIG. 6 is a schematic illustrative of one lens arrangement of Example 6. The overall power profile and zooming movements in Example 6 are the same as in Example 1.

A first lens group G1 is made up of, in order from an object side thereof, a negative meniscus lens convex on an object side thereof, and a positive meniscus lens convex on an object side thereof. The two lens are cemented together. A second lens group G2 is made up of, in order from an object side thereof, a negative meniscus lens convex on an object side thereof, a double-concave lens, and a positive meniscus lens concave on an object side thereof. A third lens group G3 is made up of, in order from an object side thereof, two double-convex lenses, and a negative meniscus lens convex on an object side thereof, with an aspherical surface being used for an object-side surface of the double-convex lens located nearest to the object side. A fourth lens group G4 is made up of one double-convex lens. Also, the zoom lens system of Example 6 satisfies the aforesaid condition (a).

FIGS. 7 to 16 are schematics illustrative of specific lens arrangements of the zoom lens systems of Examples 7 to 16 at the wide-angle ends thereof.

Figure 7:
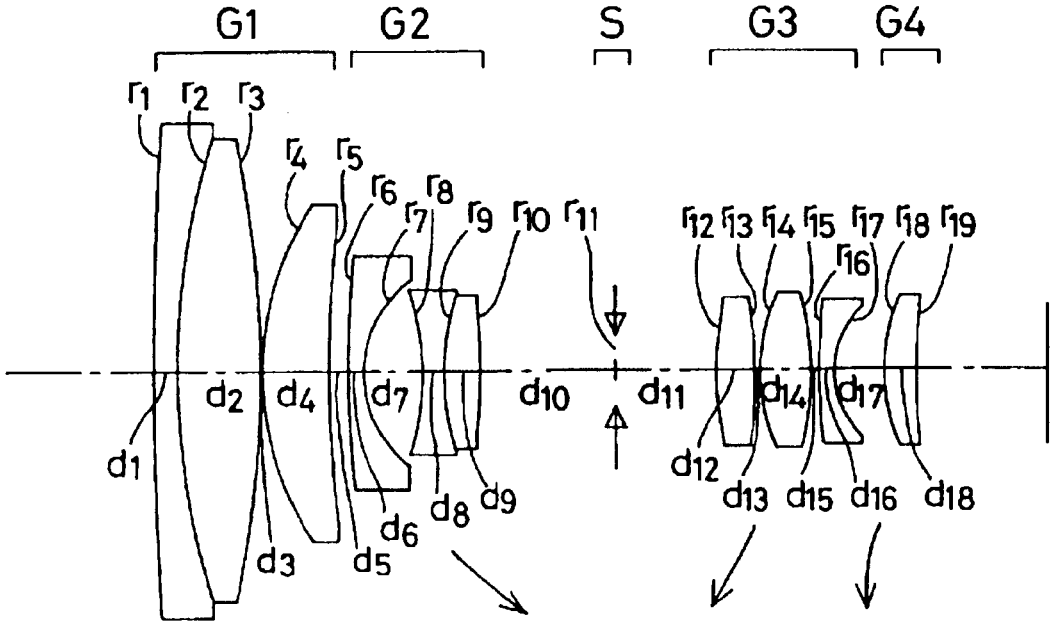
FIG. 7 is a sectional schematic of Example 1 of the zoom lens system according to the invention at a wide-angle end thereof.

Example 7 is directed to a zoom lens system having a focal length of 5.50 to 15.75 and a field angle of 66.42° to 24°. As illustrated in FIG. 7, a first lens group G1 is made up of a doublet consisting of a negative meniscus lens convex on an object side thereof and a double-convex lens, and a positive meniscus lens convex on an object side thereof. A second lens group G2 is made up of a negative meniscus lens convex on an object side thereof and a doublet consisting of a double-concave lens and a double-convex lens. At the rear of the second lens group G2 there is located a stop S. A third lens group G3 is made up of two double-convex lenses, and a negative meniscus lens convex on an object side thereof, and a fourth lens group G4 is made up of one positive meniscus lens convex on an object side thereof. An aspherical surface is used for a surface in the third lens group G3 that is located nearest to the object side. For zooming from the wide-angle end to the telephoto end, while the first lens group G1 and the stop S remain fixed, the second lens group G2 moves from the object side to the image plane side, and the third and fourth lens groups G3 and G4 move together from the image plane side to the object side with the space between them becoming wide, as shown by arrows.

Figure 8:
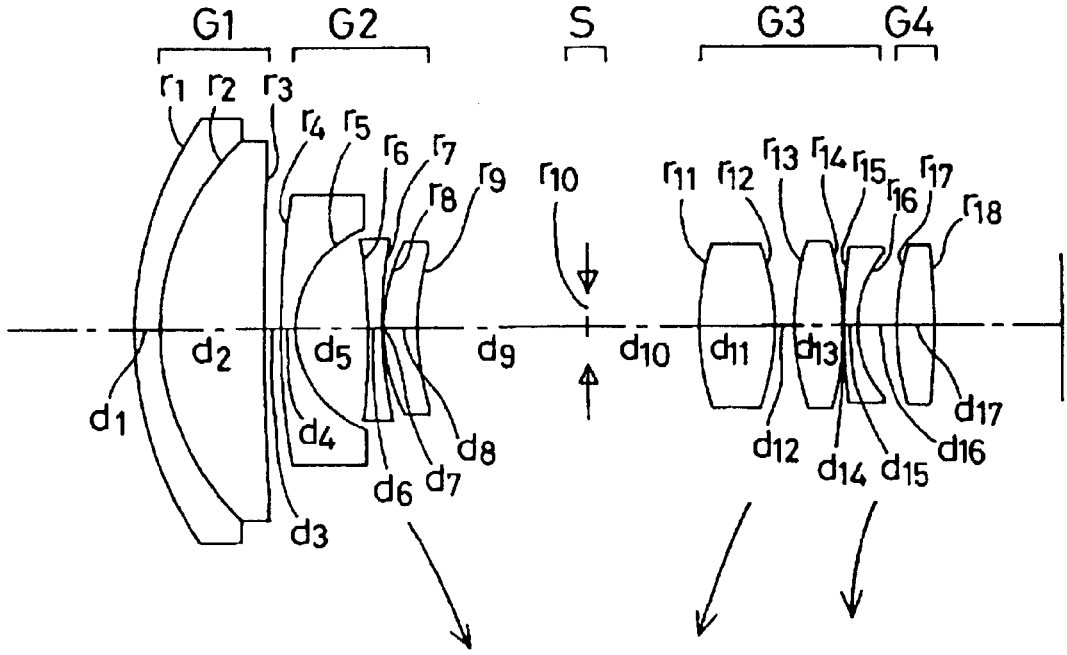
FIG. 8 is a sectional schematic of Example 2 of the zoom lens system according to the invention at a wide-angle end thereof.
Figure 9:
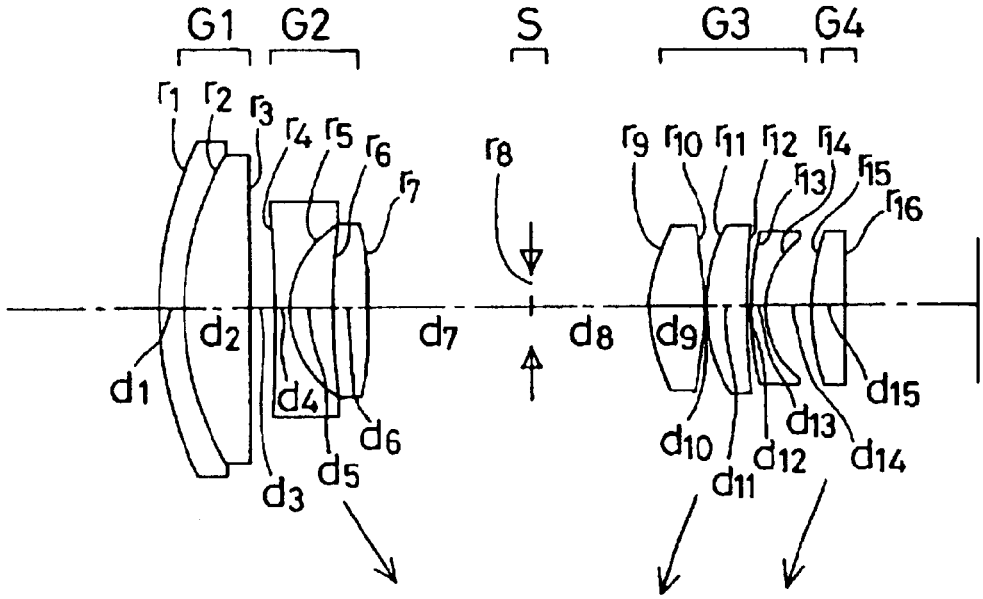
FIG. 9 is a sectional schematic of Example 3 of the zoom lens system according to the invention at a wide-angle end thereof.

Example 8 is directed to a zoom lens system having a focal length of 5.52 to 15.91 and a field angle of 67.04° to 23.72°. As shown in FIG. 8, a first lens group G1 is made up of a doublet consisting of a negative meniscus lens convex on an object side thereof and a positive meniscus lens. A second lens group G2 is made up of a negative meniscus lens convex on an object side thereof, a double-concave lens, and a positive meniscus lens convex on an object side thereof. At the rear of the second lens group G2 there is located a stop S. A third lens group G3 is made up of two double-convex lenses, and a negative meniscus lens convex on an object side thereof, and a fourth lens group G4 is made up of one double-convex lens. An aspherical surface is used for the surface in the third lens group G3 that is located nearest to the object side. For zooming from the wide-angle end to the telephoto end, while the first lens group G1 and the stop S remain fixed, the second lens group G2 moves from the object side to the image plane side of the system, and the third and fourth lens groups G3 and G4 move together from the image plane side to the object side with the space between them becoming wide.

Example 9 is directed to a zoom lens system having a focal length of 5.50 to 15.81 and a field angle of 66.82° to 23.88°. As can be seen from FIG. 9, a first lens group G1 is made up of a doublet consisting of a negative meniscus lens convex on an object side thereof and a double-convex lens. A second lens group G2 is made up of a double-concave lens and a positive lens, and at the rear thereof there is located a stop S. A third lens group G3 is made up of a double-convex lens, a positive meniscus lens convex on an object side thereof, and a negative meniscus lens convex on an object side thereof, and a fourth lens group G4 is made up of one positive meniscus lens convex on an object side thereof. Three aspherical surfaces are used, one for the surface in the second lens group G2 that is located nearest to the image plane side, one for the surface in the third lens group G3 that is located nearest to the object side, and one for the surface in the fourth lens group G4 that is located nearest to the object side. For zooming from the wide-angle end to the telephoto end of the system, while the first lens group G1 and the stop S remain fixed, the second lens group G2 moves from the object side to the image plane side, and the third and fourth lens groups G3 and G4 move together from the image plane side to the object side with the space between them becoming wide, as indicated by arrows.

Figure 10:
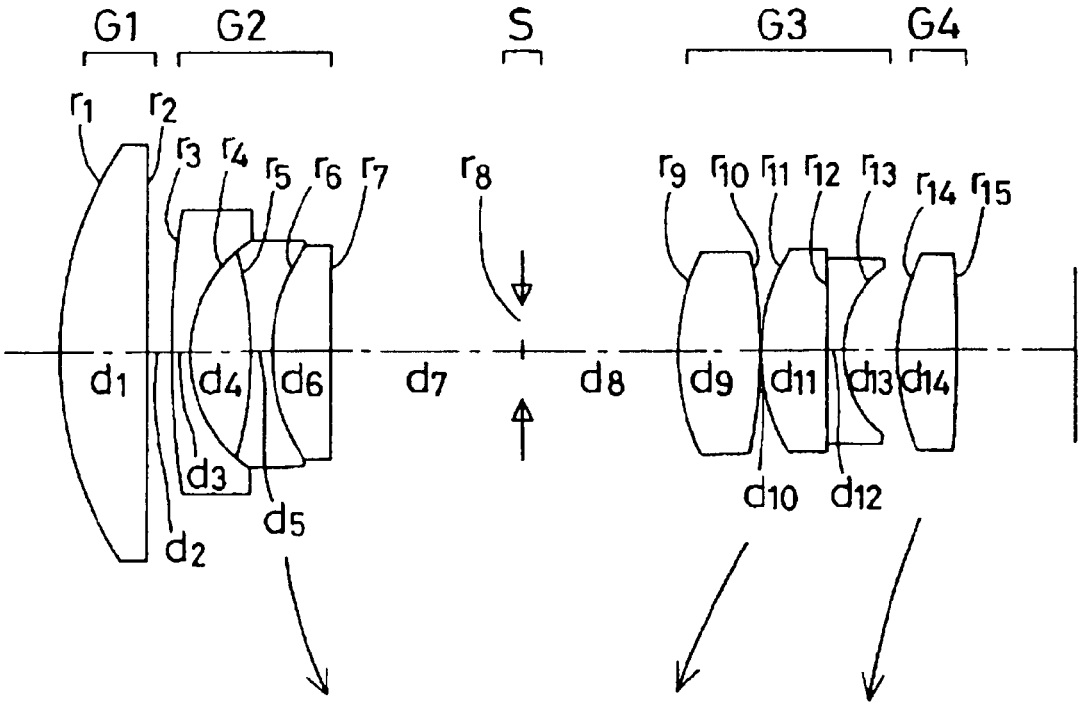
FIG. 10 is a sectional schematic of Example 4 of the zoom lens system according to the invention at a wide-angle end thereof.

Example 10 is directed to a zoom lens system having a focal length of 5.50 to 15.87 and a field angle of 64.93° to 24.87°. As depicted in FIG. 10, a first lens group G1 is made up of one positive meniscus lens convex on an object side thereof. A second lens group G2 is made up of a negative meniscus lens convex on an object side thereof, and a doublet consisting of a double-concave lens and a positive meniscus lens convex on an object side thereof, and at the rear thereof there is located a stop S. A third lens group G3 is made up of a double-convex lens, and a doublet consisting of a positive meniscus lens convex on an object side thereof and a negative meniscus lens, and a fourth lens group G4 is made up of one double-convex lens. Two aspherical surfaces are used, one for the surface in the third lens group that is located nearest to the object side, and one for the surface in the fourth lens group G4 that is located nearest to the object side. For zooming from the wide-angle end to the telephoto end of the system, while the first lens group G1 and the stop S remain fixed, the second lens group G2 moves from the object side to the image plane side, and the third and fourth lens groups G3 and G4 move together from the image plane side to the object side with the space between them becoming wide, as indicated by arrows.

Figure 11:
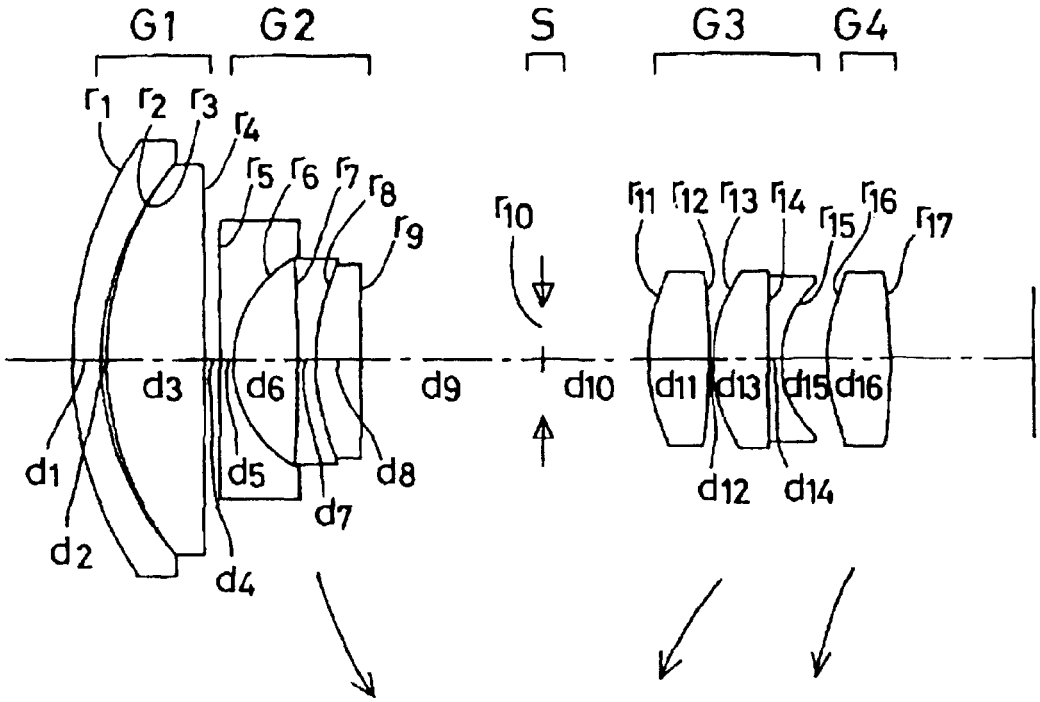
FIG. 11 is a sectional schematic of Example 5 of the zoom lens system according to the invention at a wide-angle end thereof.

Example 11 is directed to a zoom lens system having a focal length of 5.50 to 15.86 and a field angle of 68.30° to 24.54°. As illustrated in FIG. 11, a first lens group G1 is made up of a negative meniscus lens convex on an object side thereof and a positive meniscus lens convex on an object side thereof. A second lens group G2 is made up of a negative meniscus lens convex on an object side thereof, and a doublet consisting of a double-concave lens and a positive meniscus lens convex on an object side thereof, and at the rear thereof there is located a stop S. A third lens group G3 is made up of a double-convex lens, and a doublet consisting of a positive meniscus lens convex on an object side thereof and a negative meniscus lens convex on an object side thereof, and a fourth lens group G4 is made up of one double-convex lens. Three aspherical surfaces are used, one for the surface in the second lens group G2 that is located nearest to the image plane side, one for the surface in the third lens group G3 that is located nearest to the object side, and one for the surface in the fourth lens group G4 that is located nearest to the object side. For zooming from the wide-angle end to the telephoto end of the system, while the first lens group G1 and the stop S remain fixed, the second lens group G2 moves from the object side to the image plane side, and the third and fourth lens groups G3 and G4 move together from the image plane side to the object side with the space between them becoming wide, as indicated by arrows.

Figure 17:
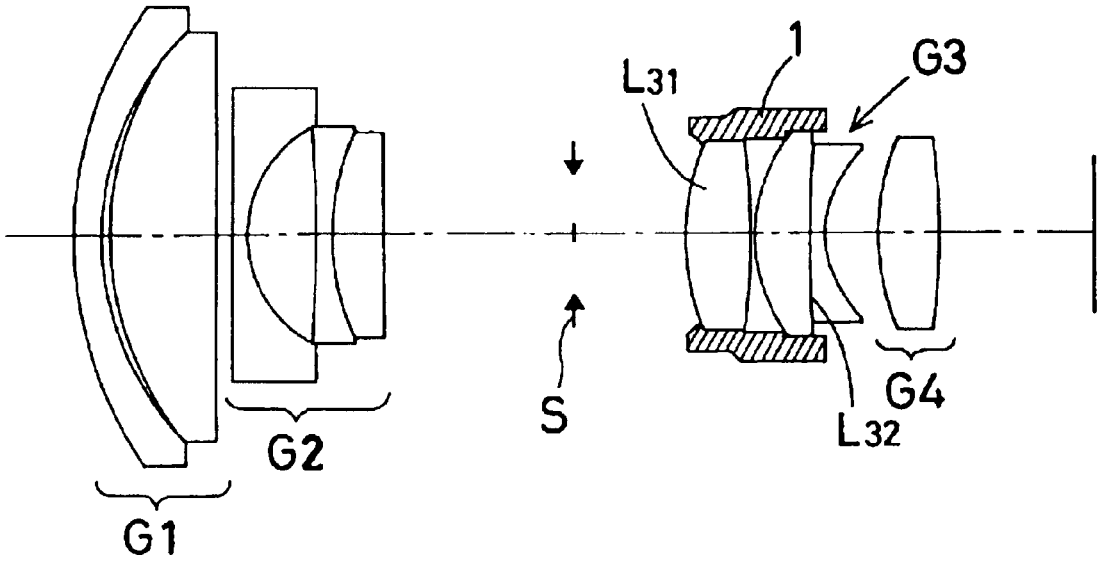
FIG. 17 is a view of a holder barrel structure for the third lens group in Example 1.

As can be seen from FIG. 17, it is to be noted that, in Example 11, the peripheries of object side-directed convex surfaces of both an object-side positive lens $L_{31}$ and a doublet $L_{32}$ in the third lens group G3 are held by a holder frame 1 while they are abutting at their peripheries or some points on the holder frame 1.

Figure 12:
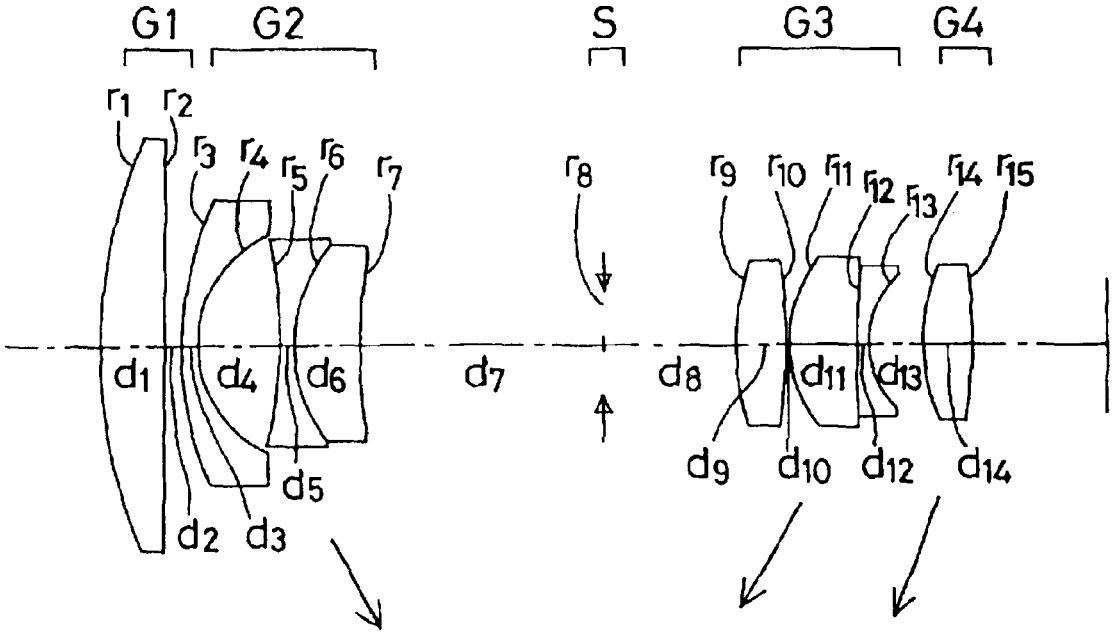
FIG. 12 is a sectional schematic of Example 6 of the zoom lens system according to the invention at a wide-angle end thereof.

Example 12 is directed to a zoom lens system having a focal length of 6.608 to 19.098 and a field angle of 67.32° to 25.95°. As shown in FIG. 12, a first lens group G1 is made up of one plano-convex lens. A second lens group G2 is made up of a negative meniscus lens convex on an object side thereof, and a doublet consisting of a double-concave lens and a positive meniscus lens convex on an object side thereof, and at the rear thereof there is located a stop S. A third lens group G3 is made up of a double-convex lens, and a doublet consisting of a positive meniscus lens convex on an object side thereof and a negative meniscus lens convex on an object side thereof, and a fourth lens group G4 is made up of one double-convex lens. Two aspherical surfaces are used, one for the surface in the third lens group G3 that is located nearest to an object side thereof and one for the surface in the fourth lens group G4 that is located to an object side thereof. For zooming from the wide-angle end to the telephoto end of the system, while the first lens group G1 and the stop S remain fixed, the second lens group G2 moves from the object side to the image plane side of the system, and the third and fourth lens groups G3 and G4 move together from the image plane side to the object side with the space between them becoming wide, as indicated by arrows.

Figure 13:
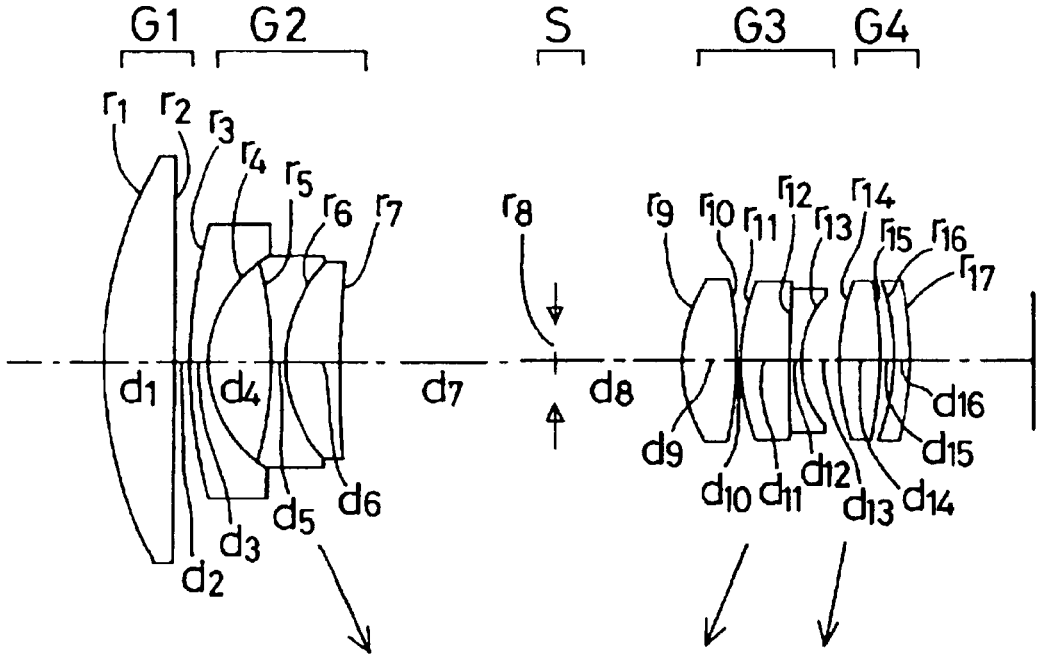
FIG. 13 is a sectional schematic of Example 7 of the zoom lens system according to the invention at a wide-angle end thereof.

Example 13 is directed to a zoom lens system having a focal length of 6.613 to 18.999 and a field angle of 67.68° to 26.08°. As depicted in FIG. 13, a first lens group G1 is made up of one plane-convex lens. A second lens group G2 is made up of a negative meniscus lens convex on an object side thereof, and a doublet consisting of a double-concave lens and a positive meniscus lens convex on an object side thereof, and at the rear thereof there is located a stop S. A third lens group G3 is made up of a double-convex lens, and a doublet consisting of a positive meniscus lens convex on an object side thereof and a negative meniscus lens convex on an object side thereof, and a fourth lens group G4 is made up of a double-convex lens, and a negative meniscus lens convex on an image side thereof. An aspherical surface is used for the surface in the third lens group G3 that is located nearest to an object side thereof. For zooming from the wide-angle end to the telephoto end of the system, while the first lens group G1 and the stop S remain fixed, the second lens group G2 moves from the object side to the image plane side the system, and the third and fourth lens groups G3 and G4 moves together from the image plane side to the object side with the space between them becoming wide, as indicated by arrows.

Figure 14:
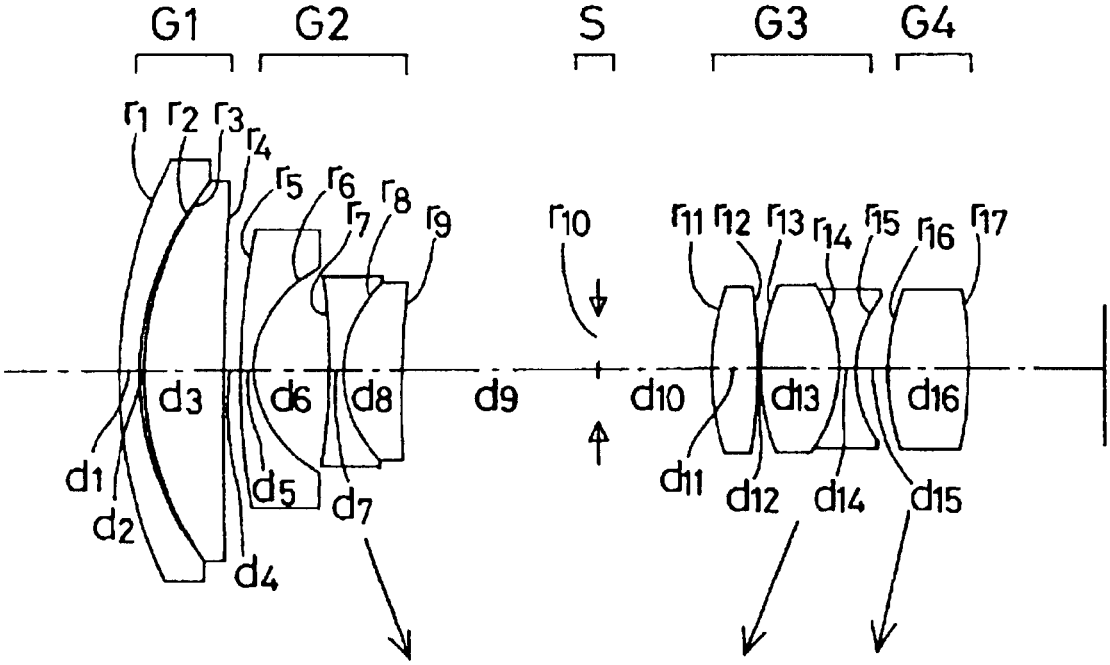
FIG. 14 is a sectional schematic of Example 8 of the zoom lens system according to the invention at a wide-angle end thereof.

Example 14 is directed to a zoom lens system having a focal length of 6.548 to 19 and a field angle of 67.80° to 26.08°. As illustrated in FIG. 14, a first lens group G1 is made up of a negative meniscus lens convex on an object side thereof, and a positive meniscus lens convex on an object side thereof. A second lens group G2 is made up of a negative meniscus lens convex on an object side thereof, and a doublet consisting of a double-concave lens and a positive meniscus lens convex on an object side thereof, and at the rear thereof there is located a stop S. A third lens group G3 is made up of a double-convex lens, and a doublet consisting of a double-convex lens and double-concave lens, and a fourth lens group G4 is made up of one double-convex lens. Two aspherical surfaces are used, one for the surface in the third lens group G3 that is located nearest to an object side thereof, and one for the surface in the fourth lens group G4 that is located nearest to an object side thereof. For zooming from the wide-angle end to the telephoto end of the system, while the first lens group G1 and the stop S remain fixed, the second lens group G2 moves from the object side to the image plane side of the system, and the third and fourth lens groups G3 and G4 move together from the image plane side to the object side with the space between them becoming wide, an indicated by arrows.

Figure 15:
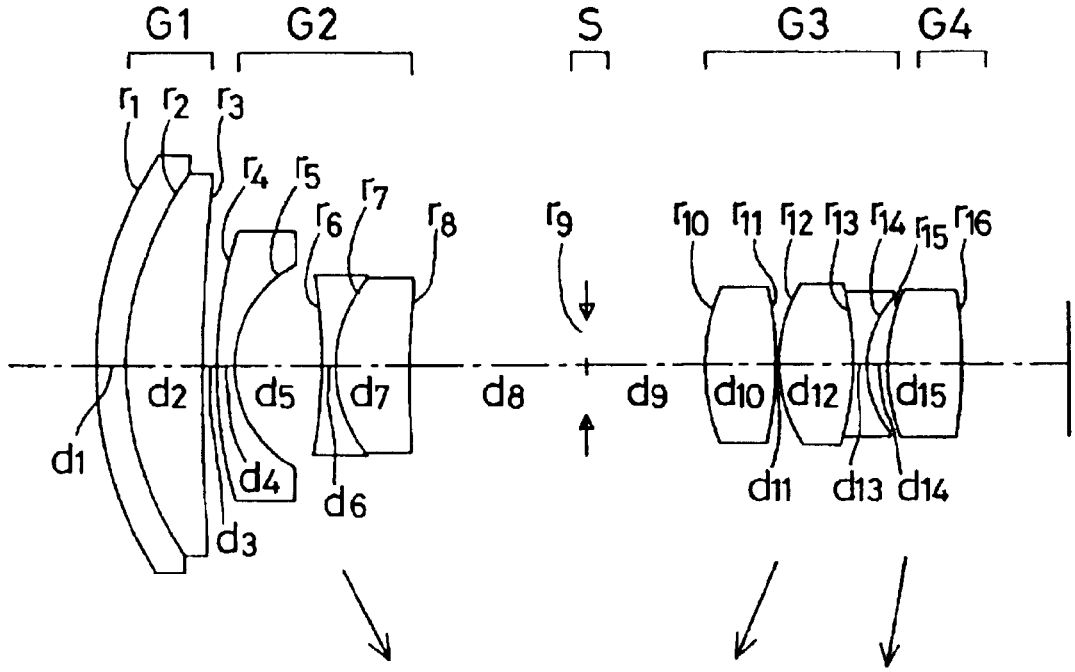
FIG. 15 is a sectional schematic of Example 9 of the zoom lens system according to the invention at a wide-angle end thereof.

Example 15 is directed to a zoom lens system having a focal length of 6.562 to 19 and a field angle of 67.69° to 26.08°. As shown in FIG. 15, a first lens group G1 is made up of a doublet consisting of a negative meniscus lens convex on an object side thereof and a positive meniscus lens convex on an object side thereof. A second lens group G2 is made up of a negative meniscus lens convex on an object side thereof, and a doublet consisting of a double-concave lens and a positive meniscus lens convex on an object side thereof, and at the rear thereof there is located a stop S. A third lens group G3 is made up of a double-convex lens, and a double consisting of a double-convex lens and a double-concave lens, and a fourth lens group G4 is made up of one double-convex lens. Two spherical surfaces are used, one for the surface in the third lens group G3 that is located nearest to an object side thereof, and one for the surface in the fourth lens group G4 that is located nearest to an object side thereof. For zooming from the wide-angle end to the telephoto end of the system, while the first lens group G1 and the stop S remain fixed, the second lens group G2 moves from an object side to an image plane side of the system, and the third and fourth lens groups G3 and G4 move together from the image plane side to the object side with a space between them becoming wide, as indicated by arrows.

Figure 16:
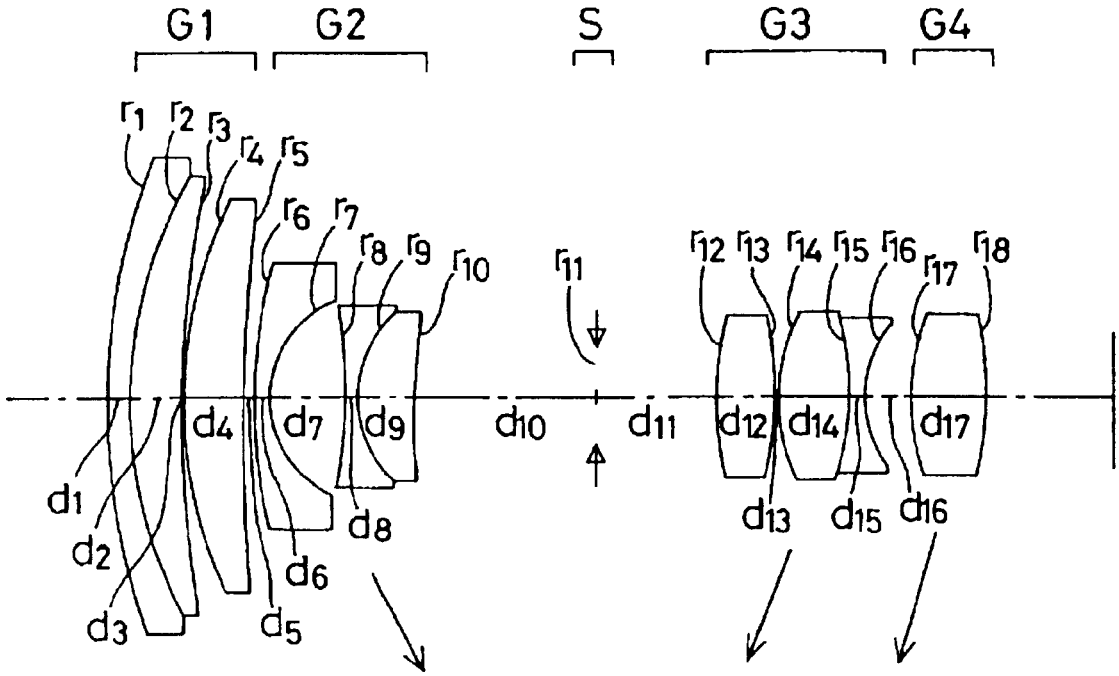
FIG. 16 is a sectional schematic of Example 10 of the zoom lens system according to the invention at a wide-angle end thereof.

Example 16 is directed to a zoom lens system having a focal length of 6.46 to 19 and a field angle of 68.52° to 26.08°. As shown in FIG. 16, a first lens group G1 is made up of a doublet consisting of a negative meniscus lens convex on an object side thereof and a positive meniscus lens convex on an object side thereof, and a positive meniscus lens convex on an object side thereof. A second lens group G2 is made up of a negative meniscus lens convex on an object side thereof, and a doublet consisting of a double-concave lens and a positive meniscus lens convex on an object side thereof, and at the rear thereof there is located a stop S. A third lens group G3 is made up of a double-convex lens, and a doublet consisting of a double-convex lens and a double-concave lens, and a fourth lens group G4 is made up of one double-convex lens. Two aspherical surfaces are used, one for the surface in the third lens group G3 that is located nearest to an object side thereof, and one for the surface in the fourth lens group G4 that is located nearest to an object side thereof. For zooming from the wide-angle end to the telephoto end of the system, while the first lens group G1 and the stop S remain fixed, the second lens group G2 moves from the object side to the image plane side of the system, and the third and fourth lens groups G3 and G4 move together from the image plane side to the object side, with the space between them becoming wide, as indicated by arrows.

Enumerated below are numerical data in each example. Symbols used hereinafter but not hereinbefore have the following meanings.

f . . . Focal length of the system.

$F_{NO}$ . . . F-number.

ω . . . Half field angle.

$r_1$, $r_2$, . . . Radius of curvature of each lens surface.

$d_1, d_2, \ldots$ space between adjacent lens surfaces.

$n_{d1}, n_{d2}, \ldots$ Refractive index of each lens at d-line.

$\nu_{d1}, \nu_{d2}, \ldots$ Abbe's number of each lens at d-line. Here let x stand for an optical axis assuming the direction of propagation of light is positive and y indicate a direction perpendicular to the optical axis. Then, aspherical shape is given by $$x=(y^2/r)/[1+\{1-(K+1)(y/r)^2\}^{1/2}]+A_4y^4+A_6y^6+A_8y^8+A_{10}y^{10}+A_{12}y^{12}$$

where r is a paraxial radius of curvature, K is a conical coefficient, and $A_4$, $A_6$, $A_8$, $A_{10}$, and $A_{12}$ are fourth, sixth, eighth, tenth, and twelfth aspherical coefficients, respectively.

EXAMPLE 1 f = 5.50~9.52~15.94
$F_{NO}$ = 2.79~3.39~4.22
2ω = 63.5~39.3~24.1

| | | | |
|---|---|---|---|
| $r_1$ = 17.3312 | $d_1$ = 1.200 | $n_{d1}$ = 1.84666 | $\nu_{d1}$ = 23.78 |
| $r_2$ = 14.2714 | $d_2$ = 0.550 | | |
| $r_3$ = 19.0981 | $d_3$ = 2.566 | $n_{d2}$ = 1.69680 | $\nu_{d2}$ = 55.53 |
| $r_4$ = −211.9146 | $d_4$ = (Variable) | | |
| $r_5$ = −99.9978 | $d_5$ = 0.840 | $n_{d3}$ = 1.77250 | $\nu_{d3}$ = 49.60 |
| $r_6$ = 4.9137 | $d_6$ = 1.765 | | |
| $r_7$ = 16.3236 | $d_7$ = 1.760 | $n_{d4}$ = 1.80518 | $\nu_{d4}$ = 25.42 |
| $r_8$ = 99.9991 (Aspheric) | $d_8$ = (Variable) | | |
| $r_9$ = ∞ (Stop) | $d_9$ = (Variable) | | |
| $r_{10}$ = 4.9282 (Aspheric) | $d_{10}$ = 2.900 | $n_{d5}$ = 1.58913 | $\nu_{d5}$ = 61.18 |
| $r_{11}$ = −21.5942 | $d_{11}$ = 0.316 | | |
| $r_{12}$ = 8.1812 | $d_{12}$ = 0.700 | $n_{d6}$ = 1.84666 | $\nu_{d6}$ = 23.78 |
| $r_{13}$ = 3.9286 | $d_{13}$ = (Variable) | | |
| $r_{14}$ = 12.8501 | $d_{14}$ = 2.100 | $n_{d7}$ = 1.69680 | $\nu_{d7}$ = 55.53 |
| $r_{15}$ = −35.2750 | | | |

Zooming Spaces

| | | | |
|---|---|---|---|
| f | 5.50 | 9.52 | 15.94 |
| $d_4$ | 0.989 | 4.786 | 8.395 |
| $d_8$ | 8.706 | 4.910 | 1.300 |
| $d_9$ | 5.958 | 2.921 | 0.936 |
| $d_{13}$ | 2.295 | 4.273 | 4.368 |

Aspherical Coefficients

8th surface

K = 0
$A_4 = -6.0228 \times 10^{-4}$
$A_6 = -8.2596 \times 10^{-6}$
$A_8 = -2.9515 \times 10^{-8}$
$A_{10} = -3.1439 \times 10^{-8}$ 10th surface K = −0.2184
$A_4 = -9.2750 \times 10^{-4}$
$A_6 = -4.4012 \times 10^{-6}$
$A_8 = -3.1389 \times 10^{-7}$
$A_{10} = -2.1537 \times 10^{-8}$
$|L_3|/L_2| = 0.678$

EXAMPLE 2 f = 5.33~9.23~15.45
$F_{NO}$ = 2.79~3.11~3.56
2ω = 65.1~40.5~24.8

| | | | |
|---|---|---|---|
| $r_1$ = 17.5585 | $d_1$ = 1.200 | $n_{d1}$ = 1.84666 | $\nu_{d1}$ = 23.78 |
| $r_2$ = 12.7200 | $d_2$ = 1.068 | | |

-continued

| | | | |
|---|---|---|---|
| $r_3$ = 16.3917 | $d_3$ = 3.679 | $n_{d2}$ = 1.69680 | $\nu_{d2}$ = 55.53 |
| $r_4$ = −84.4913 | $d_4$ = (Variable) | | |
| $r_5$ = −48.2980 | $d_5$ = 0.840 | $n_{d3}$ = 1.77250 | $\nu_{d3}$ = 49.60 |
| $r_6$ = 5.3611 | $d_6$ = 1.827 | | |
| $r_7$ = 19.9998 | $d_7$ = 0.600 | $n_{d4}$ = 1.48749 | $\nu_{d4}$ = 70.21 |
| $r_8$ = 8.1444 | $d_8$ = 1.800 | $n_{d5}$ = 1.84666 | $\nu_{d5}$ = 23.78 |
| $r_9$ = 18.3790 (Aspheric) | $d_9$ = (Variable) | | |
| $r_{10}$ = ∞ (Stop) | $d_{10}$ = (Variable) | | |
| $r_{11}$ = 5.9522 (Aspheric) | $d_{11}$ = 2.300 | $n_{d6}$ = 1.58913 | $\nu_{d6}$ = 61.18 |
| $r_{12}$ = −23.5594 | $d_{12}$ = 0.1500 | | |
| $r_{13}$ = 8.1391 | $d_{13}$ = 1.500 | $n_{d7}$ = 1.60311 | $\nu_{d7}$ = 60.64 |
| $r_{14}$ = 19.5373 | $d_{14}$ = 0.100 | | |
| $r_{15}$ = 12.8481 | $d_{15}$ = 0.700 | $n_{d8}$ = 1.84666 | $\nu_{d8}$ = 23.78 |
| $r_{16}$ = 4.0598 | $d_{16}$ = (Variable) | | |
| $r_{17}$ = 9.9038 | $d_{17}$ = 2.100 | $n_{d9}$ = 1.69680 | $\nu_{d9}$ = 55.53 |
| $r_{18}$ = −33.9009 | | | |

Zooming Spaces

| | | | |
|---|---|---|---|
| f | 5.33 | 9.23 | 15.45 |
| $d_4$ | 0.903 | 5.403 | 8.750 |
| $d_9$ | 9.247 | 4.746 | 1.400 |
| $d_{10}$ | 3.751 | 2.293 | 0.936 |
| $d_{16}$ | 3.894 | 3.917 | 3.510 |

Aspherical Coefficients

9th surface

K = 0
$A_4 = -3.8188 \times 10^{-4}$
$A_6 = -5.4534 \times 10^{-6}$
$A_8 = -5.0916 \times 10^{-8}$
$A_{10} = -1.5222 \times 10^{-8}$ 11th surface K = −0.2184
$A_4 = -7.0868 \times 10^{-4}$
$A_6 = 2.5182 \times 10^{-5}$
$A_8 = -3.9567 \times 10^{-6}$
$A_{10} = -1.7645 \times 10^{-7}$
$|L_3|/L_2| = 0.359$

EXAMPLE 3 f = 5.50~9.53~15.81
$F_{NO}$ = 2.79~3.35~4.33
2ω = 63.4~39.3~24.3

| | | | |
|---|---|---|---|
| $r_1$ = 19.0896 | $d_1$ = 1.200 | $n_{d1}$ = 1.84666 | $\nu_{d1}$ = 23.78 |
| $r_2$ = 14.7521 | $d_2$ = 3.097 | $n_{d2}$ = 1.60311 | $\nu_{d2}$ = 60.64 |
| $r_3$ = −7692.3867 | $d_3$ = (Variable) | | |
| $r_4$ = −76.4386 | $d_4$ = 0.840 | $n_{d3}$ = 1.77250 | $\nu_{d3}$ = 49.60 |
| $r_5$ = 4.8598 | $d_5$ = 1.811 | | |
| $r_6$ = 18.2814 | $d_6$ = 1.760 | $n_{d4}$ = 1.80518 | $\nu_{d4}$ = 25.42 |
| $r_7$ = ∞ (Aspheric) | $d_7$ = (Variable) | | |
| $r_8$ = ∞ (Stop) | $d_8$ = (Variable) | | |
| $r_9$ = 7.3400 (Aspheric) | $d_9$ = 2.642 | $n_{d5}$ = 1.58913 | $\nu_{d5}$ = 61.18 |
| $r_{10}$ = −22.1205 | $d_{10}$ = 0.150 | | |
| $r_{11}$ = 8.0241 | $d_{11}$ = 1.973 | $n_{d6}$ = 1.72916 | $\nu_{d6}$ = 54.68 |
| $r_{12}$ = 52.4926 | $d_{12}$ = 0.150 | | |
| $r_{13}$ = 14.0423 | $d_{13}$ = 0.700 | $n_{d7}$ = 1.84666 | $\nu_{d7}$ = 23.78 |
| $r_{14}$ = 4.0797 | $d_{14}$ = (Variable) | | |
| $r_{15}$ = 10.1820 (Aspheric) | $d_{15}$ = 1.745 | $n_{d8}$ = 1.58913 | $\nu_{d8}$ = 61.14 |
| $r_{18}$ = 1133.0330 | | | |

Zooming Spaces

| | | | |
|---|---|---|---|
| f | 5.50 | 9.53 | 15.81 |
| $d_3$ | 1.157 | 5.471 | 8.096 |
| $d_7$ | 8.238 | 3.924 | 1.300 |

-continued

| | | | |
|---|---|---|---|
| $d_8$ | 5.647 | 3.626 | 0.936 |
| $d_{14}$ | 2.073 | 3.422 | 4.464 |

Aspherical Coefficients

7th surface $K = 0$
$A_4 = -5.8146 \times 10^{-4}$
$A_6 = -3.5256 \times 10^{-7}$
$A_8 = -1.1100 \times 10^{-6}$
$A_{10} = 9.7216 \times 10^{-9}$ 9th surface $K = -0.2184$
$A_4 = -5.1506 \times 10^{-4}$
$A_6 = -2.2707 \times 10^{-6}$
$A_8 = 2.5686 \times 10^{-7}$
$A_{10} = -1.0482 \times 10^{-8}$ 15th surface $K = 0$
$A_4 = -2.2630 \times 10^{-4}$
$A_6 = 1.7763 \times 10^{-5}$
$A_8 = -1.5096 \times 10^{-6}$
$A_{10} = -9.3766 \times 10^{-8}$
$|L_3|/|L_2| = 0.679$

EXAMPLE 4

$f = 5.50 \sim 9.53 \sim 15.95$
$F_{NO} = 2.79 \sim 3.14 \sim 3.97$
$2\omega = 63.4 \sim 39.3 \sim 24.1$

| | | | |
|---|---|---|---|
| $r_1 = 19.3574$ | $d_1 = 1.200$ | $n_{d1} = 1.84666$ | $\nu_{d1} = 23.78$ |
| $r_2 = 14.9375$ | $d_2 = 0.349$ | | |
| $r_3 = 17.7409$ | $d_3 = 2.752$ | $n_{d2} = 1.69680$ | $\nu_{d2} = 55.53$ |
| $r_4 = -175.9537$ | $d_4$ = (Variable) | | |
| $r_5 = -99.9969$ | $d_5 = 0.840$ | $n_{d3} = 1.77250$ | $\nu_{d3} = 49.60$ |
| $r_6 = 4.6050$ | $d_6 = 1.733$ | | |
| $r_7 = 14.5468$ | $d_7 = 1.760$ | $n_{d4} = 1.80518$ | $\nu_{d4} = 25.42$ |
| $r_8 = 60.0003$ (Aspheric) | $d_8$ = (Variable) | | |
| $r_9 = \infty$ (Stop) | $d_9$ = (Variable) | | |
| $r_{10} = 6.3631$ (Aspheric) | $d_{10} = 2.300$ | $n_{d5} = 1.58913$ | $\nu_{d5} = 61.18$ |
| $r_{11} = -29.3771$ | $d_{11} = 0.150$ | | |
| $r_{12} = 12.3021$ | $d_{12} = 1.270$ | $n_{d6} = 1.60311$ | $\nu_{d6} = 60.64$ |
| $r_{13} = 69.7876$ | $d_{13} = 0.650$ | | |
| $r_{14} = 11.6182$ | $d_{14} = 0.700$ | $n_{d7} = 1.84666$ | $\nu_{d7} = 23.78$ |
| $r_{15} = 4.4105$ | $d_{15}$ = (Variable) | | |
| $r_{16} = 15.0443$ | $d_{16} = 2.100$ | $n_{d8} = 1.69680$ | $\nu_{d8} = 55.53$ |
| $r_{17} = -22.9162$ | | | |

Zooming Spaces

| | | | |
|---|---|---|---|
| f | 5.50 | 9.53 | 15.95 |
| $d_4$ | 1.089 | 5.514 | 8.193 |
| $d_6$ | 8.404 | 3.979 | 1.300 |
| $d_8$ | 5.452 | 3.557 | 0.936 |
| $d_{15}$ | 2.363 | 2.908 | 3.253 |

Aspherical Coefficients

8th surface $K = 0$
$A_4 = -6.0060 \times 10^{-4}$
$A_6 = -2.5355 \times 10^{-5}$
$A_8 = 1.4947 \times 10^{-6}$
$A_{10} = -1.2788 \times 10^{-7}$ 10th surface $K = -0.2184$
$A_4 = -6.2370 \times 10^{-4}$ -continued $A_6 = -6.8746 \times 10^{-7}$
$A_8 = 1.5135 \times 10^{-7}$
$A_{10} = 1.2164 \times 10^{-8}$
$|L_3|/|L_2| = 0.636$

EXAMPLE 5

$f = 5.34 \sim 9.26 \sim 15.34$
$F_{NO} = 2.79 \sim 3.36 \sim 4.48$
$2\omega = 64.9 \sim 40.3 \sim 25.0$

| | | | |
|---|---|---|---|
| $r_1 = 19.0276$ | $d_1 = 1.200$ | $n_{d1} = 1.84666$ | $\nu_{d1} = 23.78$ |
| $r_2 = 13.5393$ | $d_2 = 3.589$ | $n_{d2} = 1.60311$ | $\nu_{d2} = 60.64$ |
| $r_3 = -422.2925$ | $d_3$ = (Variable) | | |
| $r_4 = -644.1560$ | $d_4 = 0.840$ | $n_{d3} = 1.77250$ | $\nu_{d3} = 49.60$ |
| $r_5 = 4.6769$ | $d_5 = 1.796$ | | |
| $r_6 = 12.4221$ | $d_6 = 1.760$ | $n_{d4} = 1.80518$ | $\nu_{d4} = 25.42$ |
| $r_7 = \infty$ (Aspheric) | $d_7 = 0.300$ | | |
| $r_8 = -19.3978$ | $d_8 = 0.800$ | $n_{d5} = 1.51633$ | $\nu_{d5} = 64.14$ |
| $r_9 = 112.3274$ | $d_9$ = (Variable) | | |
| $r_{10} = \infty$ (Stop) | $d_{10}$ = (Variable) | | |
| $r_{11} = 7.4109$ (Aspheric) | $d_{11} = 2.727$ | $n_{d6} = 1.58913$ | $\nu_{d6} = 61.18$ |
| $r_{12} = -19.0346$ | $d_{12} = 0.150$ | | |
| $r_{13} = 8.1629$ | $d_{13} = 2.046$ | $n_{d7} = 1.72916$ | $\nu_{d7} = 54.68$ |
| $r_{14} = 103.6201$ | $d_{14} = 0.150$ | | |
| $r_{15} = 14.0489$ | $d_{15} = 0.700$ | $n_{d8} = 1.84666$ | $\nu_{d8} = 23.78$ |
| $r_{16} = 3.9993$ | $d_{16}$ = (Variable) | | |
| $r_{17} = 10.7947$ (Aspheric) | $d_{17} = 1.676$ | $n_{d9} = 1.58913$ | $\nu_{d9} = 61.14$ |
| $r_{18} = 244.0022$ | | | |

Zooming Spaces

| | | | |
|---|---|---|---|
| f | 5.50 | 9.53 | 15.34 |
| $d_3$ | 0.983 | 4.951 | 6.943 |
| $d_9$ | 7.260 | 3.292 | 1.300 |
| $d_{10}$ | 5.781 | 3.776 | 0.936 |
| $d_{16}$ | 2.140 | 3.006 | 3.335 |

Aspherical Coefficients

7th surface $K = 0$
$A_4 = -5.8146 \times 10^{-4}$
$A_6 = -3.5256 \times 10^{-7}$
$A_8 = -1.1100 \times 10^{-6}$
$A_{10} = 9.7216 \times 10^{-9}$ 11th surface $K = -0.2184$
$A_4 = -6.0173 \times 10^{-4}$
$A_6 = -3.9633 \times 10^{-6}$
$A_8 = 5.1710 \times 10^{-7}$
$A_{10} = -1.9276 \times 10^{-8}$ 17th surface $K = 0$
$A_4 = -9.0648 \times 10^{-5}$
$A_6 = 1.6145 \times 10^{-5}$
$A_8 = -1.1806 \times 10^{-6}$
$A_{10} = 1.0627 \times 10^{-7}$
$|L_3|/|L_2| = 0.813$

EXAMPLE 6

$f = 5.52 \sim 9.54 \sim 15.91$
$F_{NO} = 2.78 \sim 3.39 \sim 4.22$
$2\omega = 63.2 \sim 39.2 \sim 24.1$

| | | | |
|---|---|---|---|
| $r_1 = 18.1384$ | $d_1 = 1.200$ | $n_{d1} = 1.84666$ | $\nu_{d1} = 23.78$ |
| $r_2 = 12.8515$ | $d_2 = 5.173$ | $n_{d2} = 1.60311$ | $\nu_{d2} = 60.64$ |
| $r_3 = 229.0114$ | $d_3$ = (Variable) | | |

-continued

| | | | |
|---|---|---|---|
| $r_4$ = 41.3044 | $d_4$ = 0.783 | $n_{d3}$ = 1.65160 | $\nu_{d3}$ = 58.55 |
| $r_5$ = 5.1749 | $d_5$ = 3.535 | | |
| $r_6$ = −33.2963 | $d_6$ = 0.700 | $n_{d4}$ = 1.56384 | $\nu_{d4}$ = 60.67 |
| $r_7$ = 20.7633 | $d_7$ = 0.000 | | |
| $r_8$ = 8.2198 | $d_8$ = 1.760 | $n_{d5}$ = 1.80518 | $\nu_{d5}$ = 25.42 |
| $r_9$ = 13.1948 | $d_9$ = (Variable) | | |
| $r_{10}$ = ∞ (Stop) | $d_{10}$ = (Variable) | | |
| $r_{11}$ = 12.3402 (Aspheric) | $d_{11}$ = 3.698 | $n_{d6}$ = 1.67790 | $\nu_{d6}$ = 55.34 |
| $r_{12}$ = −11.8524 | $d_{12}$ = 0.858 | | |
| $r_{13}$ = 11.4834 | $d_{13}$ = 2.355 | $n_{d7}$ = 1.60311 | $\nu_{d7}$ = 60.64 |
| $r_{14}$ = −18.6404 | $d_{14}$ = 0.130 | | |
| $r_{15}$ = 48.4996 | $d_{15}$ = 0.700 | $n_{d8}$ = 1.84666 | $\nu_{d8}$ = 23.78 |
| $r_{16}$ = 5.5496 | $d_{16}$ = (Variable) | | |
| $r_{17}$ = 14.2502 | $d_{17}$ = 1.722 | $n_{d9}$ = 1.58913 | $\nu_{d9}$ = 61.14 |
| $r_{18}$ = −86.9086 | | | |

Zooming Spaces

| | | | |
|---|---|---|---|
| f | 5.52 | 9.54 | 15.91 |
| $d_3$ | 0.684 | 4.781 | 7.816 |
| $d_9$ | 8.425 | 4.327 | 1.300 |
| $d_{10}$ | 5.375 | 3.214 | 0.936 |
| $d_{18}$ | 1.927 | 3.500 | 3.547 |

Aspherical Coefficients

11th surface

K = −0.2184
$A_4 = -7.1086 \times 10^{-4}$
$A_6 = 2.9893 \times 10^{-5}$
$A_8 = -3.3152 \times 10^{-6}$
$A_{10} = -1.3762 \times 10^{-7}$
$|L_3|/|L_2| = 0.622$

EXAMPLE 7 f = 5.505~9.536~15.745
$F_{NO}$ = 2.792~3.216~4.113

| | | | |
|---|---|---|---|
| $r_1$ = 186.5411 | $d_1$ = 1.2000 | $n_{d1}$ = 1.84666 | $\nu_{d1}$ = 23.78 |
| $r_2$ = 39.3312 | $d_2$ = 3.9807 | $n_{d2}$ = 1.48749 | $\nu_{d2}$ = 70.23 |
| $r_3$ = −56.8902 | $d_3$ = 0.1800 | | |
| $r_4$ = 14.7260 | $d_4$ = 3.2694 | $n_{d3}$ = 1.69680 | $\nu_{d3}$ = 55.53 |
| $r_5$ = 62.1210 | $d_5$ = (Variable) | | |
| $r_6$ = 74.5065 | $d_6$ = 0.8400 | $n_{d4}$ = 1.77250 | $\nu_{d4}$ = 49.60 |
| $r_7$ = 5.5423 | $d_7$ = 2.9761 | | |
| $r_8$ = −9.7293 | $d_8$ = 0.8400 | $n_{d5}$ = 1.48749 | $\nu_{d5}$ = 70.21 |
| $r_9$ = 11.8229 | $d_9$ = 1.8000 | $n_{d6}$ = 1.84666 | $\nu_{d6}$ = 23.78 |
| $r_{10}$ = −139.7255 | $d_{10}$ = (Variable) | | |
| $r_{11}$ = ∞ (Stop) | $d_{11}$ = (Variable) | | |
| $r_{12}$ = 11.6742 (Aspheric) | $d_{12}$ = 1.9422 | $n_{d7}$ = 1.58913 | $\nu_{d7}$ = 61.18 |
| $r_{13}$ = −23.0900 | $d_{13}$ = 0.1500 | | |
| $r_{14}$ = 8.6783 | $d_{14}$ = 2.6167 | $n_{d8}$ = 1.72916 | $\nu_{d8}$ = 54.68 |
| $r_{15}$ = −12.4135 | $d_{15}$ = 0.3000 | | |
| $r_{16}$ = 26.9742 | $d_{16}$ = 0.7000 | $n_{d9}$ = 1.84666 | $\nu_{d9}$ = 23.78 |
| $r_{17}$ = 4.2272 | $d_{17}$ = (Variable) | | |
| $r_{18}$ = 9.6808 | $d_{18}$ = 1.6130 | $n_{d10}$ = 1.72916 | $\nu_{d10}$ = 54.68 |
| $r_{19}$ = 32.9326 | | | |

Zooming Spaces

| | | | |
|---|---|---|---|
| f | 5.505 | 9.536 | 15.745 |
| $d_5$ | 0.9695 | 4.4520 | 6.3793 |
| $d_{10}$ | 6.7009 | 3.2199 | 1.3000 |
| $d_{11}$ | 4.8930 | 3.4069 | 0.9360 |
| $d_{17}$ | 2.4323 | 3.4685 | 5.3700 |

-continued

Aspherical Coefficients

12th surface

K = −0.2184
$A_4 = -9.0556 \times 10^{-4}$
$A_6 = -2.5457 \times 10^{-5}$
$A_8 = 1.4387 \times 10^{-6}$
$A_{10} = -9.7103 \times 10^{-8}$
$|F_2/F_3| = 0.714$
$F_3/F_4 = 0.539$
$|\beta_{2T}| = 0.897$
$|L_3/L_2| = 0.73$
$(F_{3,4W})/IH = 2.44$
$F_1/IH = 6.97$

EXAMPLE 8 f = 5.524~9.537~15.914
$F_{NO}$ = 2.784~3.389~4.215

| | | | |
|---|---|---|---|
| $r_1$ = 18.1384 | $d_1$ = 1.2000 | $n_{d1}$ = 1.84666 | $\nu_{d1}$ = 23.78 |
| $r_2$ = 12.8515 | $d_2$ = 5.1730 | $n_{d2}$ = 1.60311 | $\nu_{d2}$ = 60.64 |
| $r_3$ = 229.0224 | $d_3$ = (Variable) | | |
| $r_4$ = 41.3044 | $d_4$ = 0.7827 | $n_{d3}$ = 1.65160 | $\nu_{d3}$ = 58.55 |
| $r_5$ = 5.1749 | $d_5$ = 3.5350 | | |
| $r_6$ = −33.2963 | $d_6$ = 0.7000 | $n_{d4}$ = 1.56384 | $\nu_{d4}$ = 60.67 |
| $r_7$ = 20.7633 | $d_7$ = −0.0132 | | |
| $r_8$ = 8.2198 | $d_8$ = 1.7596 | $n_{d5}$ = 1.80518 | $\nu_{d5}$ = 25.42 |
| $r_9$ = 13.1948 | $d_9$ = (Variable) | | |
| $r_{10}$ = ∞ (Stop) | $d_{10}$ = (Variable) | | |
| $r_{11}$ = 12.3402 (Aspheric) | $d_{11}$ = 3.6983 | $n_{d6}$ = 1.67790 | $\nu_{d6}$ = 55.34 |
| $r_{12}$ = −11.8524 | $d_{12}$ = 0.8580 | | |
| $r_{13}$ = 11.4834 | $d_{13}$ = 2.3550 | $n_{d7}$ = 1.60311 | $\nu_{d7}$ = 60.64 |
| $r_{14}$ = −18.6404 | $d_{14}$ = 0.1297 | | |
| $r_{15}$ = 48.4996 | $d_{15}$ = 0.7000 | $n_{d8}$ = 1.84666 | $\nu_{d8}$ = 23.78 |
| $r_{16}$ = 5.5496 | $d_{16}$ = (Variable) | | |
| $r_{17}$ = 14.2502 | $d_{17}$ = 1.7219 | $n_{d9}$ = 1.58913 | $\nu_{d9}$ = 61.14 |
| $r_{18}$ = −86.9086 | | | |

Zooming Spaces

| | | | |
|---|---|---|---|
| f | 5.524 | 9.537 | 15.914 |
| $d_3$ | 0.6836 | 4.7810 | 7.8162 |
| $d_9$ | 8.4251 | 4.3267 | 1.3000 |
| $d_{10}$ | 5.3747 | 3.2145 | 0.9360 |
| $d_{16}$ | 1.9272 | 3.5002 | 3.5470 |

Aspherical Coefficients

11th surface

K = −0.2184
$A_4 = -7.1086 \times 10^{-4}$
$A_6 = 2.9893 \times 10^{-5}$
$A_8 = -3.3152 \times 10^{-6}$
$A_{10} = = 1.3762 \times 10^{-7}$
$|F_2/F_3| = 0.837$
$F_3/F_4 = 0.475$
$|\beta_{2T}| = 0.501$
$|L_3/L_2| = 0.62$
$(F_{3,4W})/IH = 2.58$
$F_1/IH = 10.99$

EXAMPLE 9 f = 5.505~9.528~15.810
$F_{NO}$ = 2.786~3.348~4.330

| | | | |
|---|---|---|---|
| $r_1$ = 19.0896 | $d_1$ = 1.2000 | $n_{d1}$ = 1.84666 | $\nu_{d1}$ = 23.78 |
| $r_2$ = 14.7521 | $d_2$ = 3.0968 | $n_{d2}$ = 1.60311 | $\nu_{d2}$ = 60.64 |
| $r_3$ = −7692.3867 | $d_3$ = (Variable) | | |

-continued

| | | | |
|---|---|---|---|
| $r_4 = -76.4386$ | $d_4 = 0.8400$ | $n_{d3} = 1.77250$ | $\nu_{d3} = 49.60$ |
| $r_5 = 4.8598$ | $d_5 = 1.8112$ | | |
| $r_6 = 18.2814$ | $d_6 = 1.7596$ | $n_{d4} = 1.80518$ | $\nu_{d4} = 25.42$ |
| $r_7 = \infty$ (Aspheric) | $d_7$ = (Variable) | | |
| $r_8 = \infty$ (Stop) | $d_8$ = (Variable) | | |
| $r_9 = 7.3400$ (Aspheric) | $d_9 = 2.6421$ | $n_{d5} = 1.58913$ | $\nu_{d5} = 61.18$ |
| $r_{10} = -22.1205$ | $d_{10} = 0.1500$ | | |
| $r_{11} = 8.0241$ | $d_{11} = 1.9734$ | $n_{d6} = 1.72916$ | $\nu_{d6} = 54.68$ |
| $r_{12} = 52.4926$ | $d_{12} = 0.1500$ | | |
| $r_{13} = 14.0423$ | $d_{13} = 0.7000$ | $n_{d7} = 1.84666$ | $\nu_{d7} = 23.78$ |
| $r_{14} = 4.0797$ | $d_{14}$ = (Variable) | | |
| $r_{15} = 10.1820$ (Aspheric) | $d_{15} = 1.7446$ | $n_{d8} = 1.58913$ | $\nu_{d8} = 61.14$ |
| $r_{16} = 1133.0330$ | | | |

Zooming Spaces

| | | | |
|---|---|---|---|
| f | 5.505 | 9.528 | 15.810 |
| $d_3$ | 1.1566 | 5.4711 | 8.0959 |
| $d_7$ | 8.2383 | 3.9238 | 1.3000 |
| $d_8$ | 5.6465 | 3.6256 | 0.9360 |
| $d_{14}$ | 2.0735 | 3.4220 | 4.4638 |

Aspherical Coefficients

7th surface $K = 0$
$A_4 = -5.8146 \times 10^{-4}$
$A_6 = -3.5256 \times 10^{-7}$
$A_8 = -1.1100 \times 10^{-6}$
$A_{10} = 9.7216 \times 10^{-9}$ 9th surface $K = -0.2184$
$A_4 = -5.1506 \times 10^{-4}$
$A_6 = -2.2707 \times 10^{-6}$
$A_8 = 2.5686 \times 10^{-7}$
$A_{10} = -1.0482 \times 10^{-8}$ 15th surface $K = 0$
$A_4 = -2.2630 \times 10^{-4}$
$A_6 = -1.7763 \times 10^{-5}$
$A_8 = -1.5096 \times 10^{-6}$
$A_{10} = -9.3766 \times 10^{-8}$
$|F_2/F_3| = 0.866$
$F_3/F_4 = 0.591$
$|\beta_{2T}| = 0.575$
$|L_3/L_2| = 0.68$
$(F_{3,4W})/IH = 2.52$
$F_1/IH = 10.06$

EXAMPLE 10

$f = 5.502 \sim 9.509 \sim 15.873$
$F_{NO} = 2.777 \sim 3.341 \sim 4.352$

| | | | |
|---|---|---|---|
| $r_1 = 16.5657$ | $d_1 = 3.6105$ | $n_{d1} = 1.48749$ | $\nu_{d1} = 70.23$ |
| $r_2 = 570.4842$ | $d_2$ = (Variable) | | |
| $r_3 = 33.8910$ | $d_3 = 0.8356$ | $n_{d2} = 1.84666$ | $\nu_{d2} = 23.78$ |
| $r_4 = 5.4863$ | $d_4 = 2.6452$ | | |
| $r_5 = -13.8594$ | $d_5 = 0.8000$ | $n_{d3} = 1.48749$ | $\nu_{d3} = 70.23$ |
| $r_6 = 7.7346$ | $d_6 = 2.6020$ | $n_{d4} = 1.84666$ | $\nu_{d4} = 23.78$ |
| $r_7 = 423.2622$ | $d_7$ = (Variable) | | |
| $r_8 = \infty$ (Stop) | $d_8$ = (Variable) | | |
| $r_9 = 8.6181$ (Aspheric) | $d_9 = 3.3470$ | $n_{d5} = 1.56384$ | $\nu_{d5} = 60.67$ |
| $r_{10} = -16.8991$ | $d_{10} = 0.1208$ | | |
| $r_{11} = 7.7569$ | $d_{11} = 2.8653$ | $n_{d6} = 1.77250$ | $\nu_{d6} = 49.60$ |
| $r_{12} = 258.5476$ | $d_{12} = 0.7000$ | $n_{d7} = 1.84666$ | $\nu_{d7} = 23.78$ |
| $r_{13} = 4.5291$ | $d_{13}$ = (Variable) | | |
| $r_{14} = 9.7155$ (Aspheric) | $d_{14} = 2.4486$ | $n_{d8} = 1.56384$ | $\nu_{d8} = 60.67$ |
| $r_{15} = -47.1886$ | | | |

-continued

Zooming Spaces

| | | | |
|---|---|---|---|
| f | 5.502 | 9.509 | 15.873 |
| $d_2$ | 0.9830 | 5.3731 | 8.0323 |
| $d_7$ | 8.3593 | 3.9739 | 1.3000 |
| $d_8$ | 6.5283 | 4.2008 | 0.9360 |
| $d_{13}$ | 2.2562 | 3.7723 | 5.1579 |

Aspherical Coefficients

9th surface $K = -0.2184$
$A_4 = -3.1865 \times 10^{-4}$
$A_6 = 2.3167 \times 10^{-7}$
$A_8 = 1.3223 \times 10^{-8}$
$A_{10} = 1.9200 \times 10^{-10}$ 14th surface $K = 0$
$A_4 = -1.1041 \times 10^{-4}$
$A_6 = -2.7188 \times 10^{-6}$
$A_8 = 3.7776 \times 10^{-7}$
$A_{10} = 0$
$|F_2/F_3| = 0.779$
$F_3/F_4 = 0.794$
$|\beta_{2T}| = 0.586$
$|L_3/L_2| = 0.792$
$(F_{3,4W})/IH = 2.71$
$F_1/IH = 9.98$

EXAMPLE 11

$f = 5.504 \sim 9.432 \sim 15.856$
$F_{NO} = 1.990 \sim 2.273 \sim 2.711$

| | | | |
|---|---|---|---|
| $r_1 = 18.2001$ | $d_1 = 1.1730$ | $n_{d1} = 1.80518$ | $\nu_{d1} = 25.42$ |
| $r_2 = 13.0296$ | $d_2 = 0.3357$ | | |
| $r_3 = 13.9728$ | $d_3 = 4.8470$ | $n_{d2} = 1.69680$ | $\nu_{d2} = 5553$ |
| $r_4 = 3102.7527$ | $d_4$ = (Variable) | | |
| $r_5 = 424.6070$ | $d_5 = 0.8000$ | $n_{d3} = 1.77250$ | $\nu_{d3} = 49.60$ |
| $r_6 = -5.6105$ | $d_6 = 2.9586$ | | |
| $r_7 = -105.0017$ | $d_7 = 0.8000$ | $n_{d4} = 1.48749$ | $\nu_{d4} = 70.23$ |
| $r_8 = -10.6618$ | $d_8 = 2.3225$ | $n_{d5} = 1.77250$ | $\nu_{d5} = 29.20$ |
| $r_9 = -71.1193$ (Aspheric) | $d_9$ = (Variable) | | |
| $r_{10} = \infty$ (Stop) | $d_{10}$ = (Variable) | | |
| $r_{11} = 9.2181$ (Aspheric) | $d_{11} = 2.9948$ | $n_{d6} = 1.66910$ | $\nu_{d6} = 55.40$ |
| $r_{12} = -30.4447$ | $d_{12} = 0.1424$ | | |
| $r_{13} = -7.5345$ | $d_{13} = 2.5546$ | $n_{d7} = 1.67790$ | $\nu_{d7} = 55.34$ |
| $r_{14} = -80.3022$ | $d_{14} = 0.7000$ | $n_{d8} = 1.84666$ | $\nu_{d8} = 23.78$ |
| $r_{15} = -4.9693$ | $d_{15}$ = (Variable) | | |
| $r_{16} = -9.4973$ (Aspheric) | $d_{16} = 2.8365$ | $n_{d9} = 1.66910$ | $\nu_{d9} = 55.40$ |
| $r_{17} = -38.4689$ | | | |

Zooming Spaces

| | | | |
|---|---|---|---|
| f | 5.504 | 9.432 | 15.856 |
| $d_4$ | 0.7566 | 5.0506 | 8.1970 |
| $d_9$ | 8.7125 | 4.4098 | 1.3000 |
| $d_{10}$ | 4.9718 | 3.2094 | 0.9360 |
| $d_{15}$ | 2.2537 | 3.0666 | 3.9604 |

Aspherical Coefficients

9th surface $K = 0$
$A_4 = -2.6558 \times 10^{-4}$
$A_6 = 4.2392 \times 10^{-6}$
$A_8 = -5.4464 \times 10^{-7}$
$A_{10} = 1.2756 \times 10^{-8}$ 11th surface $K = 0.2184$
$A_4 = -1.8121 \times 10^{-4}$ -continued $A_6 = -1.3295 \times 10^{-6}$
$A_8 = 1.4549 \times 10^{-7}$
$A_{10} = -4.6461 \times 10^{-9}$ 16th surface $K = 0$
$A_4 = -2.5114 \times 10^{-4}$
$A_6 = 3.1103 \times 10^{-6}$
$A_8 = -1.1345 \times 10^{-8}$
$A_{10} = 0$
$|F_2/F_3| = 0.628$
$F_3/F_4 = 1.088$
$|\beta_{2T}| = 0.760$
$|L_3/L_2|$ 0.54
$(F_{3,4W})/IH = 2.67$
$F_1/IH = 8.73$

EXAMPLE 12 f = 6.608~11.270~19.098
$F_{NO}$ = 2.03~2.36~2.91

| | | | |
|---|---|---|---|
| $r_1 = 36.688$ | $d_1 = 4.14$ | $n_{d1} = 1.48749$ | $\nu_{d1} = 70.23$ |
| $r_2 = \infty$ | $d_2$ = (Variable) | | |
| $r_3 = 21.750$ | $d_3 = 1.25$ | $n_{d2} = 1.84666$ | $\nu_{d2} = 23.78$ |
| $r_4 = 8.054$ | $d_4 = 5.45$ | | |
| $r_5 = -27.511$ | $d_5 = 1.00$ | $n_{d3} = 1.48749$ | $\nu_{d3} = 70.23$ |
| $r_6 = 10.412$ | $d_6 = 4.50$ | $n_{d4} = 1.84666$ | $\nu_{d4} = 23.78$ |
| $r_7 = 40.550$ | $d_7$ = (Variable) | | |
| $r_8 = \infty$ (Stop) | $d_8$ = (Variable) | | |
| $r_9 = 17.583$ (Aspheric) | $d_9 = 3.42$ | $n_{d5} = 1.58913$ | $\nu_{d5} = 61.30$ |
| $r_{10} = -35.670$ | $d_{10} = 0.20$ | | |
| $r_{11} = 9.390$ | $d_{11} = 4.35$ | $n_{d6} = 1.77250$ | $\nu_{d6} = 49.60$ |
| $r_{12} = 87.943$ | $d_{12} = 0.90$ | $n_{d7} = 1.84666$ | $\nu_{d7} = 23.78$ |
| $r_{13} = 6.609$ | $d_{13}$ = (Variable) | | |
| $r_{14} = 13.553$ (Aspheric) | $d_{14} = 3.28$ | $n_{d8} = 1.58913$ | $\nu_{d8} = 61.30$ |
| $r_{15} = -30.808$ | | | |

Zooming Spaces

| | | | |
|---|---|---|---|
| f | 6.608 | 11.270 | 19.098 |
| $d_2$ | 1.00 | 9.66 | 15.80 |
| $d_7$ | 16.20 | 7.55 | 1.50 |
| $d_8$ | 8.66 | 5.46 | 1.50 |
| $d_{13}$ | 3.46 | 5.00 | 5.71 |

Aspherical Coefficients

9th surface $K = 0.000$
$A_4 = -4.66054 \times 10^{-5}$
$A_6 = -1.33346 \times 10^{-6}$
$A_8 = 6.88261 \times 10^{-8}$
$A_{10} = -1.18171 \times 10^{-9}$
$A_{12} = 1.21868 \times 10^{-12}$ 14th surface $K = 0.000$
$A_4 = -9.93375 \times 10^{-5}$
$A_6 = -9.76311 \times 10^{-7}$
$A_8 = 3.21037 \times 10^{-7}$
$A_{10} = -1.95172 \times 10^{-8}$
$A_{12} = 3.74139 \times 10^{-12}$
$|F_2/F_3| = 0.77$
$F_3/F_4 = 1.12$
$|\beta_{2T}| = 0.35$
$|L_3/L_2|$ 0.48
$(F_{3,4W})/IH = 3.06$
$F_1/IH = 17.10$

EXAMPLE 13 f = 6.613~11.256~18.999
$F_{NO}$ = 2.64~3.01~3.85

| | | | |
|---|---|---|---|
| $r_1 = 27.567$ | $d_1 = 4.40$ | $n_{d1} = 1.48749$ | $\nu_{d1} = 70.23$ |
| $r_2 = \infty$ | $d_2$ = (Variable) | | |
| $r_3 = 34.610$ | $d_3 = 1.00$ | $n_{d2} = 1.84666$ | $\nu_{d2} = 23.78$ |
| $r_4 = 7.611$ | $d_4 = 4.17$ | | |
| $r_5 = -26.015$ | $d_5 = 0.95$ | $n_{d3} = 1.48749$ | $\nu_{d3} = 70.23$ |
| $r_6 = 9.781$ | $d_6 = 3.36$ | $n_{d4} = 1.84666$ | $\nu_{d4} = 23.78$ |
| $r_7 = 77.491$ | $d_7$ = (Variable) | | |
| $r_8 = \infty$ (Stop) | $d_8$ = (Variable) | | |
| $r_9 = 9.059$ (Aspheric) | $d_9 = 3.46$ | $n_{d5} = 1.58913$ | $\nu_{d5} = 61.28$ |
| $r_{10} = -28.867$ | $d_{10} = 0.20$ | | |
| $r_{11} = 13.765$ | $d_{11} = 3.12$ | $n_{d6} = 1.77250$ | $\nu_{d6} = 49.60$ |
| $r_{12} = 81.243$ | $d_{12} = 0.90$ | $n_{d7} = 1.84666$ | $\nu_{d7} = 23.78$ |
| $r_{13} = 6.376$ | $d_{13}$ = (Variable) | | |
| $r_{14} = 16.883$ | $d_{14} = 2.54$ | $n_{d8} = 1.80400$ | $\nu_{d8} = 46.57$ |
| $r_{15} = -22.639$ | $d_{15} = 0.90$ | | |
| $r_{16} = -13.830$ | $d_{16} = 1.00$ | $n_{d9} = 1.84666$ | $\nu_{d9} = 23.78$ |
| $r_{17} = -20.854$ | | | |

Zooming Spaces

| | | | |
|---|---|---|---|
| f | 6.613 | 11.256 | 18.999 |
| $d_2$ | 1.00 | 8.49 | 13.22 |
| $d_7$ | 13.73 | 6.24 | 1.50 |
| $d_8$ | 8.03 | 5.46 | 1.30 |
| $d_{13}$ | 2.38 | 3.71 | 5.53 |

Aspherical Coefficients

9th surface $K = 0.000$
$A_4 = -2.44569 \times 10^{-4}$
$A_6 = 1.63587 \times 10^{-6}$
$A_8 = -2.54100 \times 10^{-7}$
$A_{10} = 1.25155 \times 10^{-8}$
$A_{12} = -2.30862 \times 10^{-10}$
$|F_2/F_3| = 0.76$
$F_3/F_4 = 1.09$
$|\beta_{2T}| = 0.50$
$|L_3/L_2|$ 0.55
$(F_{3,4W})/IH = 2.79$
$F_1/IH = 12.85$

EXAMPLE 14 f = 6.548~11.266~19.000
$F_{NO}$ = 2.02~2.33~2.80

| | | | |
|---|---|---|---|
| $r_1 = 28.972$ | $d_1 = 1.50$ | $n_{d1} = 1.84666$ | $\nu_{d1} = 23.78$ |
| $r_2 = 19.691$ | $d_2 = 0.22$ | | |
| $r_3 = 20.405$ | $d_3 = 4.96$ | $n_{d2} = 1.77250$ | $\nu_{d2} = 49.60$ |
| $r_4 = 196.549$ | $d_4$ = (Variable) | | |
| $r_5 = 42.098$ | $d_5 = 1.00$ | $n_{d3} = 1.77250$ | $\nu_{d3} = 449.60$ |
| $r_6 = 7.090$ | $d_6 = 4.71$ | | |
| $r_7 = -42.098$ | $d_7 = 0.95$ | $n_{d4} = 1.57250$ | $\nu_{d4} = 57.74$ |
| $r_8 = 7.798$ | $d_8 = 3.63$ | $n_{d5} = 1.80100$ | $\nu_{d5} = 34.97$ |
| $r_9 = 51.433$ | $d_9$ = (Variable) | | |
| $r_{10} = \infty$ (Stop) | $d_{10}$ = (Variable) | | |
| $r_{11} = 13.438$ (Aspheric) | $d_{11} = 2.85$ | $n_{d6} = 1.58913$ | $\nu_{d6} = 61.30$ |
| $r_{12} = -33.468$ | $d_{12} = 0.20$ | | |
| $r_{13} = 16.565$ | $d_{13} = 5.00$ | $n_{d7} = 1.77250$ | $\nu_{d7} = 49.60$ |
| $r_{14} = 9.106$ | $d_{14} = 0.90$ | $n_{d8} = 1.68893$ | $\nu_{d8} = 31.07$ |
| $r_{15} = 7.645$ | $d_{15}$ = (Variable) | | |
| $r_{16} = 13.914$ (Aspheric) | $d_{16} = 5.00$ | $n_{d9} = 1.58913$ | $\nu_{d9} = 61.30$ |
| $r_{17} = -26.414$ | | | |

-continued

Zooming Spaces

| | | | |
|---|---|---|---|
| f | 6.548 | 11.266 | 19.000 |
| $d_4$ | 1.00 | 7.40 | 12.09 |
| $d_9$ | 12.59 | 6.19 | 1.50 |
| $d_{10}$ | 7.10 | 4.41 | 1.35 |
| $d_{15}$ | 2.01 | 3.28 | 3.97 |

Aspherical Coefficients

11th surface $K = 0.000$
$A_4 = -1.15802 \times 10^{-4}$
$A_6 = -2.30929 \times 10^{-6}$
$A_8 = 9.29778 \times 10^{-8}$
$A_{10} = -1.70572 \times 10^{-9}$ 16th surface $K = 0.000$
$A_4 = -1.50902 \times 10^{-4}$
$A_6 = 7.59738 \times 10^{-6}$
$A_8 = -4.34345 \times 10^{-7}$
$A_{10} = 9.20410 \times 10^{-9}$
$|F_2/F_3| = 0.64$
$F_3/F_4 = 1.07$
$|\beta_{2T}| = 0.56$
$|L_3/L_2|$ 0.52
$(F_{3,4W})/IH = 2.81$
$F_1/IH = 10.96$

EXAMPLE 15 f = 6.562~11.266~19.000
$F_{NO}$ = 2.03~2.41~2.98

| | | | |
|---|---|---|---|
| $r_1 = 27.565$ | $d_1 = 1.80$ | $n_{d1} = 1.84666$ | $\nu_{d1} = 23.78$ |
| $r_2 = 22.250$ | $d_2 = 5.28$ | $n_{d2} = 1.69680$ | $\nu_{d2} = 55.53$ |
| $r_3 = 146.290$ | $d_3$ = (Variable) | | |
| $r_4 = 33.155$ | $d_4 = 1.20$ | $n_{d3} = 1.84666$ | $\nu_{d3} = 23.78$ |
| $r_5 = 7.643$ | $d_5 = 5.94$ | | |
| $r_6 = -32.864$ | $d_6 = 0.95$ | $n_{d4} = 1.58913$ | $\nu_{d4} = 61.14$ |
| $r_7 = 9.442$ | $d_7 = 5.00$ | $n_{d5} = 1.84666$ | $\nu_{d5} = 23.78$ |
| $r_8 = 72.713$ | $d_8$ = (Variable) | | |
| $r_9 = \infty$ (Stop) | $d_9$ = (Variable) | | |
| $r_{10} = 13.995$ (Aspheric) | $d_{10} = 4.65$ | $n_{d6} = 1.58913$ | $\nu_{d6} = 61.30$ |
| $r_{11} = -26.315$ | $d_{11} = 0.20$ | | |
| $r_{12} = 11.896$ | $d_{12} = 5.00$ | $n_{d7} = 1.77250$ | $\nu_{d7} = 49.60$ |
| $r_{13} = -19.763$ | $d_{13} = 0.90$ | $n_{d8} = 1.80518$ | $\nu_{d8} = 25.42$ |
| $r_{14} = 7.049$ | $d_{14}$ = (Variable) | | |
| $r_{15} = 12.657$ (Aspheric) | $d_{15} = 5.00$ | $n_{d9} = 1.58913$ | $\nu_{d9} = 61.30$ |
| $r_{16} = -36.523$ | | | |

Zooming Spaces

| | | | |
|---|---|---|---|
| f | 6.562 | 11.266 | 19.000 |
| $d_3$ | 1.00 | 7.09 | 11.56 |
| $d_8$ | 12.07 | 5.98 | 1.50 |
| $d_9$ | 7.83 | 4.88 | 1.35 |
| $d_{14}$ | 1.29 | 3.19 | 4.54 |

Aspherical Coefficients

10th surface $K = 0.000$
$A_4 = -8.42531 \times 10^{-5}$
$A_6 = -1.06102 \times 10^{-6}$
$A_8 = 4.82414 \times 10^{-8}$
$A_{10} = -7.21004 \times 10^{-10}$ 15th surface $K = 0.00$
$A_4 = -1.53723 \times 10^{-4}$
$A_6 = 8.03934 \times 10^{-6}$
$A_8 = -4.64104 \times 10^{-7}$ -continued $A_{10} = 9.96594 \times 10^{-9}$
$|F_2/F_3| = 0.72$
$F_3/F_4 = 0.96$
$|\beta_{2T}| = 0.55$
$|L_3/L_2|$ 0.61
$(F_{3,4W})/IH = 2.73$
$F_1/IH = 11.41$

EXAMPLE 16 f = 6.460~11.267~19.000
$F_{NO}$ = 2.03~2.36~2.86

| | | | |
|---|---|---|---|
| $r_1 = 45.399$ | $d_1 = 1.50$ | $n_{d1} = 1.84666$ | $\nu_{d1} = 23.78$ |
| $r_2 = 30.450$ | $d_2 = 3.42$ | $n_{d2} = 1.77250$ | $\nu_{d2} = 49.60$ |
| $r_3 = 73.068$ | $d_3 = 0.20$ | | |
| $r_4 = 30.537$ | $d_4 = 4.00$ | $n_{d3} = 1.60311$ | $\nu_{d3} = 60.64$ |
| $r_5 = 114.998$ | $d_5$ = (Variable) | | |
| $r_6 = 37.983$ | $d_6 = 1.00$ | $n_{d4} = 1.80610$ | $\nu_{d4} = 40.92$ |
| $r_7 = 7.134$ | $d_7 = 4.94$ | | |
| $r_8 = -34.697$ | $d_8 = 0.95$ | $n_{d5} = 1.59551$ | $\nu_{d5} = 39.24$ |
| $r_9 = 7.910$ | $d_9 = 3.74$ | $n_{d6} = 1.80518$ | $\nu_{d6} = 25.42$ |
| $r_{10} = 61.919$ | $d_{10}$ = (Variable) | | |
| $r_{11} = \infty$ (Stop) | $d_{11}$ = (Variable) | | |
| $r_{12} = 20.148$ (Aspheric) | $d_{12} = 3.82$ | $n_{d7} = 1.58913$ | $\nu_{d7} = 61.30$ |
| $r_{13} = -27.415$ | $d_{13} = 0.20$ | | |
| $r_{14} = 11.775$ | $d_{14} = 5.00$ | $n_{d8} = 1.77250$ | $\nu_{d8} = 49.60$ |
| $r_{15} = -16.598$ | $d_{15} = 0.90$ | $n_{d9} = 1.74077$ | $\nu_{d9} = 27.79$ |
| $r_{16} = 7.678$ | $d_{16}$ = (Variable) | | |
| $r_{17} = 14.447$ (Aspheric) | $d_{17} = 5.00$ | $n_{d10} = 1.58913$ | $\nu_{d10} = 61.30$ |
| $r_{18} = -24.089$ | | | |

Zooming Spaces

| | | | |
|---|---|---|---|
| f | 6.460 | 11.267 | 19.000 |
| $d_5$ | 1.00 | 7.29 | 11.76 |
| $d_{10}$ | 12.25 | 5.96 | 1.50 |
| $d_{11}$ | 7.87 | 4.72 | 1.35 |
| $d_{16}$ | 2.96 | 4.38 | 4.80 |

Aspherical Coefficients

Figure 18:
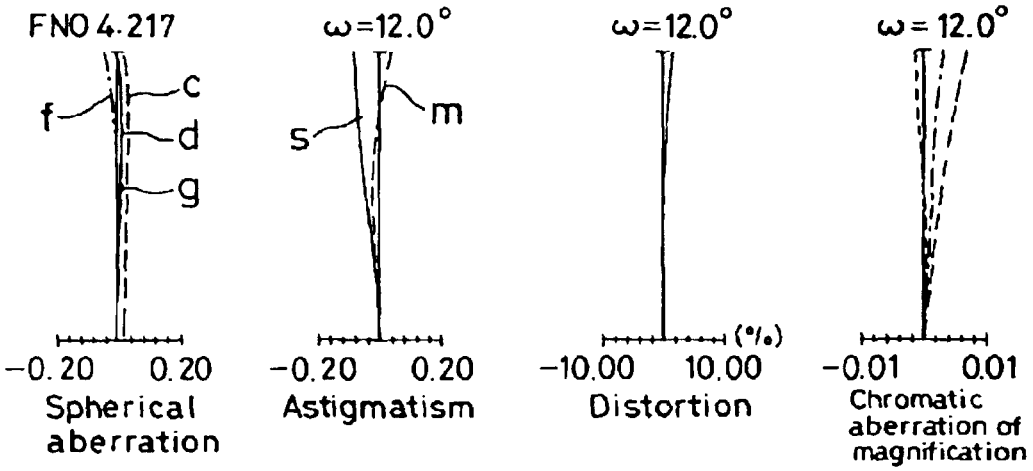
FIG. 18 is an aberration diagram of Example 1 at a wide-angle end thereof.
Figure 19:
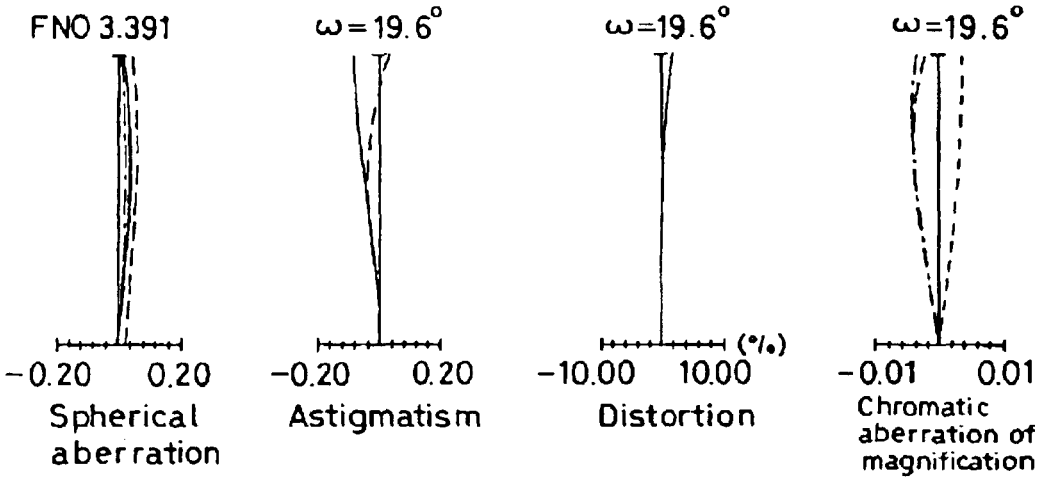
FIG. 19 is an aberration diagram of Example 1 at an intermediate focal length.
Figure 20:
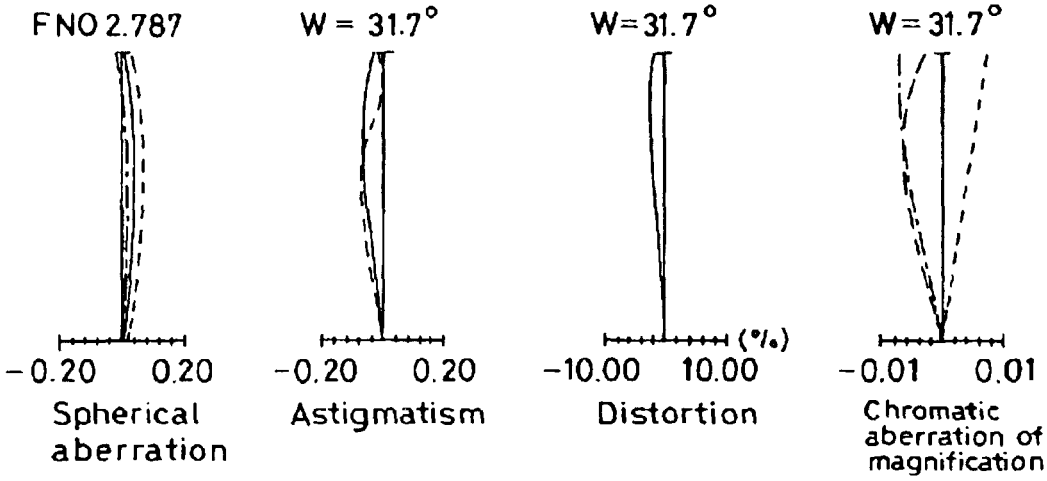
FIG. 20 is an aberration diagram of Example 1 at an telephoto end thereof.

12th surface $K = 0.000$
$A_4 = -4.84618 \times 10^{-5}$
$A_6 = -1.50477 \times 10^{-6}$
$A_8 = 6.27337 \times 10^{-8}$
$A_{10} = 9.73311 \times 10^{-10}$ 17th surface $K = 0.000$
$A_4 = -1.24232 \times 10^{-4}$
$A_6 = 4.55032 \times 10^{-6}$
$A_8 = -2.09257 \times 10^{-7}$
$A_{10} = 3.76691 \times 10^{-9}$
$|F_2/F_3| = 0.59$
$F_3/F_4 = 1.08$
$|\beta_{2T}| = 0.55$
$|L_3/L_2|$ 0.61
$(F_{3,4W})/IH = 2.96$
$F_1/IH = 11.19$ Aberration curve diagrams of Example 1 are shown in FIGS. 18 to 20 wherein FIG. 18 shows aberrations at the wide-angle end thereof, FIG. 19 aberrations at an intermediate focal length thereof, and FIG. 20 aberrations at the telephoto end thereof. The states of correction of aberrations in other examples are not illustrated because of being equivalent to that in Example 1.

As can be understood from the foregoing explanation, the present invention can provide a compact yet low-cost zoom lens system with well-corrected aberrations.

What we claim is:

1. A zoom lens system comprising in order from an object side of said system:

a first lens group having positive refracting power, a second lens group that has negative refracting power and moves from an object side to an image plane side of said system during zooming from a wide-angle end to a telephoto end of said system, a third lens group having positive refracting power, and a fourth lens group that has positive refracting power and is movable during zooming, wherein:

said first lens group consists of two lenses, a negative lens and a positive lens, [or one positive lens alone,]

said third lens group comprises three lenses, a positive lens, a positive lens and a negative lens, [or two lenses, a positive lens and a negative lens,] and said third lens group has at least one aspherical surface therein.

2. [The zoom lens system according to claim 1,] *A zoom lens system comprising in order from an object side of said system:*

*a first lens group having positive refracting power,*

*a second lens group that has negative refracting power and moves from an object side to an image plane side of said system during zooming from a wide-angle end to a telephoto end of said system,*

*a third lens group having positive refracting power, and*

*a fourth lens group that has positive refracting power and is movable during zooming, wherein:*

*said first lens group consists of two lenses, a negative lens and a positive lens, or one positive lens alone,*

*said third lens group comprises three lenses, a positive lens, a positive lens and a negative lens, or two lenses, a positive lens and a negative lens, and*

*said third lens group has at least one aspherical surface therein, and* wherein the positive lens and negative lens in said third lens group are cemented together.

3. The zoom lens system according to claim 1 or 2, wherein said third lens group moves from the image plane side to the object side during zooming from the wide-angle end to the telephoto end.

4. The zoom lens system according to claim 1 *or 2*, wherein said first lens group remains fixed during zooming.

5. The zoom lens system according to claim 1, wherein said second lens group consists of two lenses, a negative lens and a positive lens from the object side.

6. The zoom lens according to claim [1] *2*, wherein said fourth lens group consists of one positive lens alone.

7. The zoom lens system according to claim 1 *or 2*, which satisfies the following condition (a):

$$0.3<|L_3|/|L_2|<1.0 \quad \text{(a)}$$

where $L_2$ is an amount of said second lens group from the wide-angle end to the telephoto end, and $L_3$ is an amount of said third lens group from the wide-angle end to the telephoto end.

8. The zoom lens system according to claim 1 *or 2*, wherein said second lens group has at least one aspherical surface therein.

9. The zoom lens system according to claim 1 *or 2*, wherein said fourth lens group has at least one aspherical surface therein.

10. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end *and that comprises a doublet,* and a fourth lens group that has positive refracting power and is movable during zooming, and satisfying the following condition (1):

$$0.5<|F_2/F_3|<1.2 \quad (1)$$

where $F_i$ is a focal length of an i-th lens group.

11. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end *and that comprises a doublet,* and a fourth lens group that has positive refracting power and is movable during zooming, and satisfying the following condition (2):

$$0.49<|L_3/L_2|<1 \quad (2)$$

where $L_i$ is an amount of movement of an i-th lens group from the wide-angle end to the telephoto end.

12. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end and a fourth lens group that has positive refracting power and is movable during zooming, and satisfying the following condition (3):

$$2<(F_{3.4W})/IH<3.3 \quad (3)$$

where $(F_{3.4W})$ is a composite focal length of said third and fourth lens group at the wide-angle end, and IH is a radius of an image circle.

13. A zoom lens system comprising, in order from an object side of said system, a first lens group having positive refracting power, a second lens group that has negative refracting power and moves from an object side to an image plane side of said system during zooming from a wide-angle end to a telephoto end of said system, a third lens group having positive refracting power and a fourth lens group that has positive refracting power and is movable during zooming, wherein:

said third lens group comprises, in order from an object side thereof, a positive lens convex on an object side thereof and a doublet consisting of a positive lens convex on an object side thereof and a negative lens concave on an image side thereof, and peripheries of object side-directed convex surfaces of both said object-side positive lens and said doublet in said third lens group are held by a lens holder barrel while said concave surfaces are abutting at said peripheries or some points on said lens holder barrel.

14. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end *and that comprises a doublet,* and a fourth lens group that has positive refracting power and is movable during zooming, and satisfying the following conditions (1) and (2):

$$0.5<|F_2/F_3|<1.2 \quad (1)$$

$$0.49<|L_3/L_2|<1 \quad (2)$$

where $F_i$ is a focal length of an i-th lens group, and $L_i$ is an amount of movement of an i-th lens group from the wide-angle end to the telephoto end.

15. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end and a fourth lens group that has positive refracting power and is movable during zooming, and satisfying the following conditions (1) and (3):

$$0.5<|F_2/F_3|<1.2 \quad (1)$$

$$2<(F_{3.4W})/IH<3.3 \quad (2)$$

where $F_i$ is a focal length of an i-th lens group, $(F_{3.4W})$ is a composite focal length of said third and fourth lens groups at the wide-angle end, and IH, is a radius of an image circle.

16. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end and a fourth lens group that has positive refracting power and is movable during zooming, and satisfying the following conditions (2) and (3):

$$0.49<|L_3/L_2|<1 \quad (1)$$

$$2<(F_{3.4W})/IH<3.3 \quad (3)$$

where $L_i$ is an amount of movement of an i-th lens group from the wide-angle end to the telephoto end, $(F_{3.4W})$ is a composite focal length of said third and fourth lens groups at the wide-angle end, and IH is a radius of an image circle.

17. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end and a fourth lens group that has positive refracting power and is movable during zooming, and satisfying the following conditions (1), (2) and (3):

$$0.5<|F_2/F_3|<1.2 \quad (1)$$

$$0.49<|L_3/L_2|<1 \quad (2)$$

$$2<(F_{3.4W})/IH<3.3 \quad (3)$$

where $F_i$ is a focal length of an i-th lens group, $L_i$ is an amount of movement of an i-th lens group from the wide-angle end to the telephoto end, $(F_{3.4W})$ is a composite focal length of said third and fourth lens groups at the wide-angle end, and IH is a radius of an image circle.

18. The zoom lens system according to any one of claims 10, 11, 12, and 14 to 17, which satisfies the following condition (4):

$$0.6<|F_2/F_3|<1 \quad (4)$$

where $F_i$ is a focal length of an i-th lens group.

19. The zoom lens system according to claim 17, wherein said fourth lens group moves along an optical axis direction for focusing.

20. The zoom lens system according to claim 17, which satisfies the following condition (5):

$$0.3<F_3/F_4<0.8 \quad (5)$$

wherein $F_i$ is a focal length of an i-th lens group.

21. The zoom lens system according to claim 17, which satisfies the following condition (6):

$$0.4<|\beta_{2T}|<1 \quad (6)$$

where $\beta_{2T}$ is a lateral magnification of the second lens group of the telephoto end of said system.

22. The zoom lens system according to claim 17, wherein said fourth lens group consists of one positive lens.

23. The zoom lens system according to claim 17, wherein said third lens group consists of three lenses, a positive lens, a positive lens and a negative lens in order from an object side thereof.

24. The zoom lens system according to claim 17, wherein at least one surface in said third lens group is an aspherical surface.

25. The zoom lens system according to claim 17, wherein at least one surface in said fourth lens group is an aspherical surface.

26. The zoom lens system according to claim 17, wherein at least one surface in said second lens group is an aspherical surface.

27. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves from the image plane side to the object side during zooming from the wide-angle end to the telephoto end and a fourth lens group that has positive refracting power and is movable during zooming, wherein said first lens group consists of one positive lens, and a lens in said second lens group that is located nearest to an object side thereof is a negative lens that satisfies the following condition (7):

$$\nu_{21}<40 \quad (7)$$

where $\nu_{21}$ is an Abbe's number of said negative lens located nearest to the object side of said second lens group.

28. The zoom lens system according to claim 27, which satisfies the following condition (8):

$$\nu_{21}<35 \quad (8).$$

29. The zoom lens system according to claim 17, which satisfies the following condition (7):

$$\nu_{21}<40 \quad (7)$$

where $\nu_{21}$ is an Abbe's number of the negative lens located nearest to the object side of said second lens group.

30. The zoom lens system according to claim 17, which satisfies the following condition (8):

$$\nu_{21}<35 \quad (8)$$

where $\nu_{21}$ is an Abbe's number of the negative lens located nearest to the object side of said second lens group.

31. The zoom lens system according to claim 17 [or 27], wherein said third lens group comprises, in order from an object side thereof, a positive lens convex on an object side thereof and a doublet consisting of a positive lens convex on an object side thereof and a negative lens concave on an image plane side thereof, and peripheries of object side-directed convex surfaces of both said object-side positive lens and said doublet in said third lens group are held by a lens holder barrel while said convex surfaces are abutting at said peripheries or some points on said lens holder barrel.

32. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves constantly from the image plane side to the object side during zooming from the wide-angle end to the telephoto end and a fourth lens group that has positive refracting power and is movable during zooming, wherein said third lens group comprises a doublet consisting of a positive lens and a negative lens, and said fourth lens group consists of one positive lens.

33. The zoom lens system according to claim 32, wherein at least one surface of the positive lens in said fourth lens group is an aspherical surface.

34. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves constantly from the image plane side to the object side during zooming from the wide-angle end to the telephoto end and a fourth lens group that has positive refracting power and is movable during zooming, wherein each of said second and third lens groups comprises a doublet consisting of a positive lens and a negative lens.

35. A zoom lens system comprising, in order from an object side of said system, a first lens group that has positive refracting power and remains fixed during zooming, a second lens group that has negative refracting power and moves from an object side to an image plane side of said system during zooming from a wide-angle end to a telephoto end of said system, a third lens group that has positive refracting power and moves constantly from the image plane side to the object side during zooming from the wide-angle end to the telephoto end and a fourth lens group that has positive refracting power and is movable during zooming, wherein said third lens group consists of, in order from an object side thereof, a positive lens, and a doublet consisting of a positive lens and a negative lens.

36. A zoom lens system comprising, in order from an object side of said system, a first lens group having positive refracting power, a second lens group having negative refracting power, a third lens group having positive refracting power and a fourth lens group having positive refracting power, wherein during zooming, a space between said first and second lens groups, a space between said second and third lens groups and a space between said third and fourth lens groups vary independently, said third lens group consists of, in order from an object side thereof, a double-convex positive lens, and a doublet consisting of a positive meniscus lens convex on an object side thereof and a negative meniscus lens, and said fourth lens group consists of a double-convex lens having a large curvature on an object side surface thereof.

37. A zoom lens system comprising, in order from an object side of said system, a first lens group having positive refracting power, a second lens group having negative refracting power, a third lens group having positive refracting power and a fourth lens group having positive refracting power, wherein during zooming, a space between said first and second lens groups, a space between said second and third lens groups and a space between said third and fourth lens groups vary independently, said first lens group consists of one positive lens, said second lens group comprises three lenses or, in order from an object side thereof, a single lens and a doublet consisting of a negative lens and a positive lens, said third lens group comprises three lenses or, in order from an object side thereof, a single lens and a doublet consisting of a positive lens and a negative lens, and said fourth lens group consists of one positive lens.

38. A zoom lens system comprising, in order from an object side of said system, a first lens group having positive refracting power, a second lens group having negative refracting power, a third lens group having positive refracting power, and a fourth lens group having positive refracting power, wherein during zooming, a space between said first and second lens groups, a space between said second and third lens groups and a space between said third and fourth lens groups vary independently, said first lens group consists of two lenses [or], a positive lens and a negative lens, *said third lens group comprises three lenses, a positive lens, a positive lens and a negative lens,* and said second or third lens group comprises a doublet consisting of at least one set of a positive lens and a negative lens.

*39. A zoom lens system comprising in order from an object side of said system:*

*a first lens group having positive refracting power,*

*a second lens group that has negative refracting power and moves from an object side to an image plane side of said system during zooming from a wide-angle end to a telephoto end of said system,*

*a third lens group that has positive refracting power and that moves constantly from an image plane side to an object side of said system during zooming from a wide-angle end to a telephoto end of said system, and*

*a fourth lens group that has positive refracting power and is movable during zooming, wherein:*

*said first lens group consists of two lenses, a negative lens and a positive lens, or one positive lens alone,*

*said third lens group comprises three lenses, a positive lens, a positive lens and a negative lens, or two lenses, a positive lens and a negative lens, and*

*said third lens group has at least one aspherical surface therein.*

*40. A zoom lens system comprising, in order from an object side of said system, a first lens group having positive refracting power, a second lens group having negative refracting power, a third lens group that has positive refracting power and that moves constantly from an image plane side to an object side of said system during zooming from a wide-angle end to a telephoto end of said system, and a fourth lens group having positive refracting power, wherein during zooming, a space between said first and second lens groups, a space between said second and third lens groups and a space between said third and fourth lens groups vary independently, said first lens group consists of two lenses, a positive lens and a negative lens, and said second or third lens group comprises a doublet consisting of at least one set of a positive lens and a negative lens.*

*41. A zoom lens system comprising in order from an object side of said system:*

*a first lens group having positive refracting power,*

*a second lens group that has negative refracting power and is positioned on an image plane side of said system, closer to a telephoto end of said system than a wide-angle end of said system,*

*a third lens group that has positive refracting power, and*

*a fourth lens group that has positive refracting power and is movable during zooming, wherein:*

*said first lens group consists of two lenses, a negative lens and a positive lens,*

*said third lens group comprises three lenses, a positive lens, a positive lens and a negative lens, with a doublet consisting of the positive lens that is closest to the negative lens in the third lens group and the negative lens in the third lens group, and*

*said third lens group has at least one aspherical surface therein.*

*42. A zoom lens system comprising in order from an object side of said system:*

*a first lens group having positive refracting power,*

*a second lens group that has negative refracting power and is positioned on an image plane side of said system, closer to a telephoto end of said system than a wide-angle end of said system,*

*a third lens group having positive refracting power, and*

*a fourth lens group that has positive refracting power and is movable during zooming, wherein:*

*said first lens group consists of two lenses, a negative lens and a positive lens, or one positive lens alone,*

*said third lens group comprises three lenses, a positive lens, a positive lens and a negative lens, or two lenses, a positive lens and a negative lens, with a doublet consisting of the positive lens or the positive lens that is closest to the negative lens in the third lens group and the negative lens in the third lens group,*

*said third lens group has at least one aspherical surface therein, and wherein the positive lens and negative lens in said third lens group are cemented together.*

*43. The zoom lens system according to claim 42, wherein the positive and negative lenses in the doublet in said third lens group are a double convex lens and a double concave lens, respectively.*

*44. A zoom lens system comprising in order from an object side of said system:*

*a first lens group having positive refracting power,*

*a second lens group that has negative refracting power and moves from an object side to an image plane side of said system during zooming from a wide-angle end to a telephoto end of said system,*

*a third lens group having positive refracting power, and*

*a fourth lens group that has positive refracting power and is movable during zooming, wherein:*

*said first lens group consists of two lenses, a negative lens and a positive lens, or one positive lens alone,*

*said third lens group comprises three lenses, a positive lens, a positive lens and a negative lens, or two lenses, a positive lens and a negative lens, and*

*said third lens group has at least one aspherical surface therein, and*

*wherein the positive lens that is closest to the negative lens in said third lens group and the negative lens in said third lens group constitute a doublet.*

* * * * *